US012132887B2

(12) United States Patent
Chujoh et al.

(10) Patent No.: US 12,132,887 B2
(45) Date of Patent: Oct. 29, 2024

(54) VIDEO DECODING APPARATUS, VIDEO CODING APPARATUS, VIDEO DECODING METHOD, AND VIDEO CODING METHOD

(71) Applicant: Sharp Kabushiki Kaisha, Sakai (JP)

(72) Inventors: Takeshi Chujoh, Sakai (JP); Tomohiro Ikai, Sakai (JP); Tomoko Aono, Sakai (JP); Eiichi Sasaki, Sakai (JP); Tomonori Hashimoto, Sakai (JP); Tianyang Zhou, Sakai (JP); Yukinobu Yasugi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 91 days.

(21) Appl. No.: 17/914,809

(22) PCT Filed: Mar. 26, 2021

(86) PCT No.: PCT/JP2021/012759
§ 371 (c)(1),
(2) Date: Sep. 27, 2022

(87) PCT Pub. No.: WO2021/200610
PCT Pub. Date: Oct. 7, 2021

(65) Prior Publication Data
US 2023/0143900 A1    May 11, 2023

(30) Foreign Application Priority Data

Mar. 31, 2020 (JP) ................. 2020-062318

(51) Int. Cl.
*H04N 19/105* (2014.01)
*H04N 19/70* (2014.01)

(52) U.S. Cl.
CPC .......... *H04N 19/105* (2014.11); *H04N 19/70* (2014.11)

(58) Field of Classification Search
CPC ............................ H04N 19/105; H04N 19/70
(Continued)

(56) References Cited

U.S. PATENT DOCUMENTS

| 12,015,761 | B2* | 6/2024 | Hendry | ............ H04N 21/44004 |
| 2022/0417565 | A1* | 12/2022 | Zhang | .................. H04N 19/119 |

(Continued)

FOREIGN PATENT DOCUMENTS

WO    2021/169969 A1    9/2021

OTHER PUBLICATIONS

Official Communication issued in International Patent Application No. PCT/JP2021/012759, mailed on May 25, 2021.
(Continued)

*Primary Examiner* — Albert Kir
(74) *Attorney, Agent, or Firm* — Keating & Bennett, LLP

(57) ABSTRACT

A video decoding apparatus is a video decoding apparatus for deriving a prediction image by using a reference picture included in a reference picture list. The video decoding apparatus includes: a parameter decoder configured to decode (i) one or more reference picture list structures, and (ii) a first flag indicating whether first reference picture list information is present in a slice header whose nal_unit_type is an IDR picture, the one or more reference picture list structures and the first flag being included in a sequence parameter set, and a second flag indicating whether or not second reference picture list information is present in a picture header, the second flag being included in a picture parameter set; and a prediction parameter derivation unit configured to (i) derive the first reference picture list information by using nal_unit_type or the first flag and the second flag in the slice header, or derive the second reference picture list information by using the second flag in the picture header, and (ii) derive the reference picture list,
(Continued)

based on the one or more reference picture list structures. In a case that the first reference picture list is not derived, the number of entries of the one or more reference picture list structures is estimated to be 0.

6 Claims, 28 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2023/0085304 A1* | 3/2023 | Naser .................... | H04N 19/82 |
| | | | 375/240.26 |
| 2023/0088230 A1* | 3/2023 | Wang ................... | H04N 19/117 |
| 2023/0115242 A1* | 4/2023 | Laroche ............... | H04N 19/157 |
| | | | 375/240.02 |
| 2023/0145618 A1* | 5/2023 | Laroche ............... | H04N 19/119 |
| | | | 375/240.26 |

OTHER PUBLICATIONS

Bross et al., "Versatile Video Coding (Draft 8)", Joint Video Experts Team (JVET) of ITU-T SG 16 WP 3 and ISO/IEC JTC 1/SC 29/WG 11, JVET-Q2001-vE, Jan. 7-17, 2020, 512 pages.

Chujoh et al., "AHG9: Some constraints of num_ref_entries", Joint Video Experts Team (JVET) of ITU-T SG 16 WP 3 and ISO/IEC JTC 1/SC 29/WG 11. JVET-R0138-v2, Apr. 15-24, 2020, 3 pages.

* cited by examiner (a)

| seq_parameter_set_rbsp( ) { | Descriptor |
|---|---|
|    sps_decoding_parameter_set_id | ue(4) |
|    sps_video_parameter_set_id | ue(4) |
|    ... | |
|    sps_weighted_pred_flag | u(1) |
|    sps_weighted_bipred_flag | u(1) |
|    ... | |
|    long_term_ref_pics_flag | u(1) |
|    inter_layer_ref_pics_present_flag | u(1) |
|    sps_idr_rpl_present_flag | u(1) |
|    rpl1_same_as_rpl0_flag | u(1) |
|    for( i = 0; i < rpl1_same_as_rpl0_flag ? 1 : 2; i++ ) { | |
|      num_ref_pic_lists_in_sps[ i ] | ue(v) |
|      for( j = 0; j < num_ref_pic_lists_in_sps[ i ]; j++) | |
|        ref_pic_list_struct( i, j ) | |
|    } | |
|    ... | |
| } | |

(b)

| pic_parameter_set_rbsp( ) { | Descriptor |
|---|---|
|    ... | |
|    for( i = 0; i < 2; i++ ) | |
|      num_ref_idx_default_active_minus1[ i ] | ue(v) |
|    ... | |
|    pps_weighted_pred_flag | u(1) |
|    pps_weighted_bipred_flag | u(1) |
|    ... | |
|    rpl_info_in_ph_flag | u(1) |
|    ... | |
|    if( ( pps_weighted_pred_flag \|\| pps_weighted_bipred_flag ) && rpl_present_in_ph_flag ) | |
|      wp_info_in_ph_flag | u(1) |
|    ... | |
| } | |

FIG. 15

| picture_header_structure( ) { | Descriptor |
|---|---|
| ... | |
|   ph_inter_slice_allowed_flag | u(1) |
| ... | |
|   if( rpl_info_in_ph_flag ) | |
|     ref_pic_lists( ) | |
| ... | |
|   if( ph_inter_slice_allowed_flag ) { | |
| ... | |
|     if( sps_temporal_mvp_enabled_flag ) { | |
|       ph_temporal_mvp_enabled_flag | u(1) |
|       if( ph_temporal_mvp_enabled_flag && rpl_info_in_ph_flag ) { | |
|         ph_collocated_from_l0_flag | u(1) |
|         if( ( ph_collocated_from_l0_flag && <br>           num_ref_entries[ 0 ][ RplsIdx[ 0 ] ] > 1 ) \|\| <br>         ( !ph_collocated_from_l0_flag && <br>           num_ref_entries[ 1 ][ RplsIdx[ 1 ] ] > 1 ) ) | |
|           ph_collocated_ref_idx | ue(v) |
|       } | |
|     } | |
| ... | |
|     if( ( pps_weighted_pred_flag \|\| pps_weighted_bipred_flag ) && wp_info_in_ph_flag ) | |
|       pred_weight_table( ) | |
|   } | |
| ... | |
| } | |

| slice_header( ) { | Descriptor |
|---|---|
| ... | |
| if( !rpl_info_in_ph_flag && ( ( nal_unit_type != IDR_W_RADL && nal_unit_type != IDR_N_LP ) \|\| sps_idr_rpl_present_flag ) ) | |
|   ref_pic_lists( ) | |
| if( ( rpl_info_in_ph_flag \|\| ( ( nal_unit_type != IDR_W_RADL && nal_unit_type != IDR_N_LP ) \|\| sps_idr_rpl_present_flag ) ) && <br> ( slice_type != I && num_ref_entries[ 0 ][ RplsIdx[ 0 ] ] > 1 ) \|\| <br> ( slice_type == B && num_ref_entries[ 1 ][ RplsIdx[ 1 ] ] > 1 ) ) { | |
|   num_ref_idx_active_override_flag | u(1) |
|   if( num_ref_idx_active_override_flag ) | |
|     for( i = 0; i < ( slice_type == B ? 2 : 1 ); i++ ) | |
|       if( num_ref_entries[ i ][ RplsIdx[ i ] ] > 1 ) | |
|         num_ref_idx_active_minus1[ i ] | ue(v) |
| } | |
| if( slice_type != I ) { | |
| ... | |
|   if( ph_temporal_mvp_enabled_flag && !rpl_info_in_ph_flag ) { | |
|     if( slice_type == B ) | |
|       slice_collocated_from_l0_flag | u(1) |
|     if( ( slice_collocated_from_l0_flag && NumRefIdxActive[ 0 ] > 1 ) \|\| <br>       ( !slice_collocated_from_l0_flag && NumRefIdxActive[ 1 ] > 1 ) ) | |
|       slice_collocated_ref_idx | ue(v) |
|   } | |
|   if( !wp_info_in_ph_flag && ( ( pps_weighted_pred_flag && slice_type == P ) \|\| <br>     ( pps_weighted_bipred_flag && slice_type == B ) ) ) | |
|     pred_weight_table( ) | |
| } | |
| ... | |
| } | |

(b)
```
for( i = 0; i < 2; i++ ) {
  if( slice_type == B || ( slice_type == P && i == 0 ) ) {
    if( num_ref_idx_active_override_flag )
      NumRefIdxActive[ i ] = num_ref_idx_active_minus1[ i ] + 1
    else {
      if( num_ref_entries[ i ][ RplsIdx[ i ] ] >= num_ref_idx_default_active_minus1[ i ] + 1 )
        NumRefIdxActive[ i ] = num_ref_idx_default_active_minus1[ i ] + 1
      else
        NumRefIdxActive[ i ] = num_ref_entries[ i ][ RplsIdx[ i ] ]
    }
  } else /* slice_type == I || ( slice_type == P && i == 1 ) */
    NumRefIdxActive[ i ] = 0
}
```

FIG. 17

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag && wp_info_in_ph_flag ) | |
|     num_l1_weights | ue(v) |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

| ref_pic_lists( ) { | Descriptor |
|---|---|
|   for( i = 0; i < 2; i++ ) { | |
|     if( num_ref_pic_lists_in_sps[ i ] > 0 &&<br>      ( i == 0 || ( i == 1 && rpl1_idx_present_flag ) ) ) | |
|       rpl_sps_flag[ i ] | u(1) |
|     if( rpl_sps_flag[ i ] ) { | |
|       if( num_ref_pic_lists_in_sps[ i ] > 1 &&<br>        ( i == 0 || ( i == 1 && rpl1_idx_present_flag ) ) ) | |
|       rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|         poc_lsb_lt[ i ][ j ] | u(v) |
|       delta_poc_msb_present_flag[ i ][ j ] | u(1) |
|       if( delta_poc_msb_present_flag[ i ][ j ] ) | |
|         delta_poc_msb_cycle_lt[ i ][ j ] | ue(v) |
|     } | |
|   } | |
| } | |

(b)

| ref_pic_list_struct( listIdx, rplsIdx ) { | Descriptor |
|---|---|
|   num_ref_entries[ listIdx ][ rplsIdx ] | ue(v) |
|   if( long_term_ref_pics_flag ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

FIG. 19

| ref_pic_list_struct( listIdx, rplsIdx ) { | Descriptor |
|---|---|
|   num_ref_entries_minus1[ listIdx ][ rplsIdx ] | ue(v) |
|   if( long_term_ref_pics_flag ) | |
|     ltrp_in_header_flag[ listIdx ][ rplsIdx ] | u(1) |
|   for( i = 0, j = 0; i <= num_ref_entries_minus1[ listIdx ][ rplsIdx ]; i++) { | |
|     if( inter_layer_ref_pics_present_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

| picture_header_structure( ) { | Descriptor |
|---|---|
| ... | |
|   if( ph_inter_slice_allowed_flag ) { | |
|     ... | |
|     if( ( pps_weighted_pred_flag \|\| pps_weighted_bipred_flag ) && wp_info_in_ph_flag ) | |
|       NumWeightsL0 = num_ref_entries_minus1[ 0 ][RplsIdx[ 0 ] ]+1<br>      NumWeightsL1 = ((pps_weighted_bipred_flag)?<br>        num_ref_entries_minus1[ 1 ][ RplsIdx[ 1 ] ]+1 : 0)<br>      pred_weight_table( ) | |
|   } | |
| ... | |
| } | |

(b)

| slice_header( ) { | Descriptor |
|---|---|
| ... | |
|   if( slice_type != I ) { | |
|     ... | |
|     if( !wp_info_in_ph_flag &&<br>      ( ( pps_weighted_pred_flag && slice_type == P ) \|\|<br>      ( pps_weighted_bipred_flag && slice_type == B ) ) ) | |
|       NumWeightsL0 = NumRefIdxActive[ 0 ]<br>      NumWeightsL1 = NumRefIdxActive[ 1 ]<br>      pred_weight_table( ) | |
|   } | |
| ... | |
| } | |

FIG. 21

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|   } | |
| } | |

FIG. 22

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   NumWeightsL0 = (wp_info_in_ph_flag) ? | |
|     num_ref_entries_minus1[ 0 ][ RplsIdx[ 0 ] ]+1 : | |
|     NumRefIdxActive[ 0 ] | |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   NumWeightsL1 = (wp_info_in_ph_flag) ? | |
|     ((pps_weighted_bipred_flag)? | |
|     num_ref_entries_minus1[ 1 ][ RplsIdx[ 1 ] ]+1 : 0) | |
|     : NumRefIdxActive[ 1 ] | |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|     } | |
|   } | |

| picture_header_structure( ) { | Descriptor |
|---|---|
| ... | |
|   ph_inter_slice_allowed_flag | u(1) |
| ... | |
|   if( ph_inter_slice_allowed_flag ) { | |
| ... | |
|     if( rpl_info_in_ph_flag ) { | |
|       ph_num_ref_idx_active_override_flag | u(1) |
|       if( ph_num_ref_idx_active_override_flag ) | |
|         for( i = 0; i < 2; i++ ) | |
|           if( num_ref_entries_minus1[ i ][ RplsIdx[ i ] ] > 0 ) | |
|             ph_num_ref_idx_active_minus1[ i ] | ue(v) |
|     } | |
|     if( sps_temporal_mvp_enabled_flag ) { | |
|       ph_temporal_mvp_enabled_flag | u(1) |
|       if( ph_temporal_mvp_enabled_flag && rpl_info_in_ph_flag ) { | |
|         ph_collocated_from_l0_flag | u(1) |
|         if( ( ph_collocated_from_l0_flag && NumRefIdxActive[ 0 ] > 1 ) \|\| <br>           ( !ph_collocated_from_l0_flag && NumRefIdxActive[ 1 ] > 1 ) ) | |
|           ph_collocated_ref_idx | ue(v) |
|       } | |
|     } | |
| ... | |
|     if( ( pps_weighted_pred_flag \|\| pps_weighted_bipred_flag ) && wp_info_in_ph_flag ) | |
|       pred_weight_table( ) | |
|   } | |
| ... | |
| } | |

(b)
```
for( i = 0; i < 2; i++ ) {
  if( ph_num_ref_idx_active_override_flag )
    NumRefIdxActive[ i ] = ( num_ref_entries_minus1[ i ][ RplsIdx[ i ] ] > 0 )?
                          ph_num_ref_idx_active_minus1[ i ] + 1 : 1
  else {
    if( num_ref_entries_minus1[ i ][ RplsIdx[ i ] ] >= num_ref_idx_default_active_minus1[ i ] )
      NumRefIdxActive[ i ] = num_ref_idx_default_active_minus1[ i ] + 1
    else
      NumRefIdxActive[ i ] = num_ref_entries_minus1[ i ][ RplsIdx[ i ] ] + 1
  }
}
```

| slice_header( ) { | Descriptor |
|---|---|
| ... | |
|   if( !rpl_info_in_ph_flag && ( slice_type == P \|\| slice_type == B ) ) { | |
|     num_ref_idx_active_override_flag | u(1) |
|     if( num_ref_idx_active_override_flag ) | |
|       for( i = 0; i < ( slice_type == B ? 2 : 1 ); i++ ) | |
|         if( num_ref_entries_minus1[ i ][ RplsIdx[ i ] ] > 0 ) | |
|           num_ref_idx_active_minus1[ i ] | ue(v) |
|   } | |
|   if( slice_type != I ) { | |
|   ... | |
|     if( ph_temporal_mvp_enabled_flag && !rpl_info_in_ph_flag ) { | |
|       if( slice_type == B ) | |
|         slice_collocated_from_l0_flag | u(1) |
|       if( ( slice_collocated_from_l0_flag && NumRefIdxActive[ 0 ] > 1 ) \|\|<br>        ( !slice_collocated_from_l0_flag && NumRefIdxActive[ 1 ] > 1 ) ) | |
|         slice_collocated_ref_idx | ue(v) |
|     } | |
|     if( !wp_info_in_ph_flag && ( ( pps_weighted_pred_flag && slice_type == P ) \|\|<br>      ( pps_weighted_bipred_flag && slice_type == B ) ) ) | |
|       pred_weight_table( ) | |
|   } | |
| ... | |
| } | |

(b)

```
for( i = 0; i < 2; i++ ) {
  if( !rpl_info_in_ph_flag && ( slice_type == B || ( slice_type == P && i == 0 ) ) ) {
    if( num_ref_idx_active_override_flag )
      NumRefIdxActive[ i ] = ( num_ref_entries_minus1[ i ][ RplsIdx[ i ] ] > 0 )?
                     num_ref_idx_active_minus1[ i ] + 1 : 1
    else {
      if( num_ref_entries_minus1[ i ][ RplsIdx[ i ] ] >= num_ref_idx_default_active_minus1[ i ] )
        NumRefIdxActive[ i ] = num_ref_idx_default_active_minus1[ i ] + 1
      else
        NumRefIdxActive[ i ] = num_ref_entries_minus1[ i ][ RplsIdx[ i ] ] + 1
    }
  } else if( slice_type == I || ( slice_type == P && i == 1 ) )
    NumRefIdxActive[ i ] = 0
}
```

FIG. 25

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i < NumRefIdxActive[ 0 ]; i++ ) | |
|     luma_weight_l0_flag[ i ] | u(1) |
|   if( ChromaArrayType != 0 ) | |
|     for( i = 0; i < NumRefIdxActive[ 0 ]; i++ ) | |
|       chroma_weight_l0_flag[ i ] | u(1) |
|   for( i = 0; i < NumRefIdxActive[ 0 ]; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( pps_weighted_bipred_flag ) { | |
|     for( i = 0; i < NumRefIdxActive[ 1 ]; i++ ) | |
|       luma_weight_l1_flag[ i ] | u(1) |
|     if( ChromaArrayType != 0 ) | |
|       for( i = 0; i < NumRefIdxActive[ 1 ]; i++ ) | |
|         chroma_weight_l1_flag[ i ] | u(1) |
|     for( i = 0; i < NumRefIdxActive[ 1 ]; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

| picture_header_structure( ) { | Descriptor |
|---|---|
| ... | |
|   ph_inter_slice_allowed_flag | u(1) |
| ... | |
|   if( rpl_info_in_ph_flag ) { | |
|     ref_pic_lists( ) | |
|     ph_num_ref_idx_active_override_flag | u(1) |
|     if( ph_num_ref_idx_active_override_flag ) | |
|       for( i = 0; i < 2; i++ ) | |
|         if( num_ref_entries[ i ][ RplsIdx[ i ] ] > 1 ) | |
|           ph_num_ref_idx_active[ i ] | ue(v) |
|   } | |
| ... | |
|   if( ph_inter_slice_allowed_flag ) { | |
| ... | |
|     if( ( pps_weighted_pred_flag \|\| pps_weighted_bipred_flag ) && wp_info_in_ph_flag ) | |
|       pred_weight_table( ) | |
|   } | |
| ... | |
| } | |

(b)
```
for( i = 0; i < 2; i++ ) {
  if( ph_num_ref_idx_active_override_flag )
    NumRefIdxActive[ i ] = ph_num_ref_idx_active_minus1[ i ] + 1
  else {
    if( num_ref_entries[ i ][ RplsIdx[ i ] ] >= num_ref_idx_default_active_minus1[ i ] + 1 )
      NumRefIdxActive[ i ] = num_ref_idx_default_active_minus1[ i ] + 1
    else
      NumRefIdxActive[ i ] = num_ref_entries[ i ][ RplsIdx[ i ] ]
  }
}
```

| slice_header( ) { | Descriptor |
|---|---|
| ... | |
| if( !rpl_info_in_ph_flag && ( ( nal_unit_type != IDR_W_RADL && nal_unit_type != IDR_N_LP ) \|\| sps_idr_rpl_present_flag ) ) { | |
| ref_pic_lists( ) | |
| if( ( slice_type != I && num_ref_entries[ 0 ][ RplsIdx[ 0 ] ] > 1 ) \|\| ( slice_type == B && num_ref_entries[ 1 ][ RplsIdx[ 1 ] ] > 1 ) ) { | |
| num_ref_idx_active_override_flag | u(1) |
| if( num_ref_idx_active_override_flag ) | |
| for( i = 0; i < ( slice_type == B ? 2 : 1 ); i++ ) | |
| if( num_ref_entries_minus1[ i ][ RplsIdx[ i ] ] > 0 ) | |
| num_ref_idx_active_minus1[ i ] | ue(v) |
| } | |
| } | |
| if( slice_type != I ) { | |
| ... | |
| if( ph_temporal_mvp_enabled_flag && !rpl_info_in_ph_flag ) { | |
| if( slice_type == B ) | |
| slice_collocated_from_l0_flag | u(1) |
| if( ( slice_collocated_from_l0_flag && NumRefIdxActive[ 0 ] > 1 ) \|\| ( !slice_collocated_from_l0_flag && NumRefIdxActive[ 1 ] > 1 ) ) | |
| slice_collocated_ref_idx | ue(v) |
| } | |
| if( !wp_info_in_ph_flag && ( ( pps_weighted_pred_flag && slice_type == P ) \|\| ( pps_weighted_bipred_flag && slice_type == B ) ) ) | |
| pred_weight_table( ) | |
| } | |
| ... | |
| } | |

(b)
```
for( i = 0; i < 2; i++ ) {
  if( !rpl_info_in_ph_flag && ( slice_type == B || ( slice_type == P && i == 0 ) ) ) {
    if( num_ref_idx_active_override_flag )
      NumRefIdxActive[ i ] = num_ref_idx_active_minus1[ i ] + 1
    else {
      if( num_ref_entries[ i ][ RplsIdx[ i ] ] >= num_ref_idx_default_active_minus1[ i ] + 1 )
        NumRefIdxActive[ i ] = num_ref_idx_default_active_minus1[ i ] + 1
      else
        NumRefIdxActive[ i ] = num_ref_entries [ i ][ RplsIdx[ i ] ]
    }
  } else if( slice_type == I || ( slice_type == P && i == 1 ) )
    NumRefIdxActive[ i ] = 0
}
```

FIG. 28

VIDEO DECODING APPARATUS, VIDEO CODING APPARATUS, VIDEO DECODING METHOD, AND VIDEO CODING METHOD

TECHNICAL FIELD

The embodiments of the present invention relate to a prediction image generation apparatus, a video decoding apparatus, and a video coding apparatus. This application claims priority based on JP 2020-062318 filed on Mar. 31, 2020, the contents of which are incorporated herein by reference.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC, H.265/High-Efficiency Video Coding (HEVC), and the like.

In such a video coding scheme, images (pictures) constituting a video are managed in a hierarchical structure including slices obtained by splitting an image, coding tree units (CTUs) obtained by splitting a slice, units of coding (coding units; which will be referred to as CUs) obtained by splitting a coding tree unit, and transform units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, the recent technology for video coding and decoding includes NPL 1.

In NPL 1, in management of reference picture lists, a system of defining multiple reference picture lists and referring to and using the multiple reference picture lists is adopted. In weighted prediction, a method of explicitly defining the number of weights is adopted.

CITATION LIST

Non Patent Literature

Versatile Video Coding (Draft 8)", JVET-Q2001-vE, Joint Video Exploration Team (JVET) of ITU-T SG 16 WP 3 and ISO/IEC JTC 1/SC 29/WG 11, 2020 Mar. 12

Technical Problem

However, in NPL 1, in management of the reference picture lists, a reference picture list whose number of reference pictures is 0 can be defined, and thus there is a problem in that the reference picture is undetermined.

Solution to Problem

A video decoding apparatus according to an aspect of the present invention is a video decoding apparatus for deriving a prediction image by using a reference picture included in a reference picture list, the video decoding apparatus including:
a parameter decoder configured to decode
 (i) one or more reference picture list structures, and
 (ii) a first flag indicating whether first reference picture list information is present in a slice header whose nal_unit_type is an IDR picture,
  the one or more reference picture list structures and the first flag being included in a sequence parameter set, and
a second flag indicating whether or not second reference picture list information is present in a picture header, the second flag being included in a picture parameter set; and
a prediction parameter derivation unit configured to
 (i) derive the first reference picture list information by using nal_unit_type or the first flag and the second flag in the slice header, or derive the second reference picture list information by using the second flag in the picture header, and
 (ii) derive the reference picture list, based on the one or more reference picture list structures, wherein
in a case that the first reference picture list is not derived, the number of entries of the one or more reference picture list structures is estimated to be 0.

A video coding apparatus according to an aspect of the present invention is a video coding apparatus for deriving a prediction image by using a reference picture included in a reference picture list, the video coding apparatus including:
a parameter coder configured to code
 (i) one or more reference picture list structures, and
 (ii) a first flag indicating whether first reference picture list information is present in a slice header whose nal_unit_type is an IDR picture,
  the one or more reference picture list structures and the first flag being included in a sequence parameter set, and
a second flag indicating whether or not second reference picture list information is present in a picture header, the second flag being included in a picture parameter set; and
a prediction parameter derivation unit configured to
 (i) derive the first reference picture list information by using nal_unit_type or the first flag and the second flag in the slice header, or derive the second reference picture list information by using the second flag in the picture header, and
 (ii) derive the reference picture list, based on the one or more reference picture list structures, wherein
in a case that the first reference picture list is not derived, the number of entries of the one or more reference picture list structures is estimated to be 0.

A video decoding method according to an aspect of the present invention is a video decoding method of deriving a prediction image by using a reference picture included in a reference picture list, the video decoding method at least including:
decoding
 (i) one or more reference picture list structures, and
 (ii) a first flag indicating whether first reference picture list information is present in a slice header whose nal_unit_type is an IDR picture,
  the one or more reference picture list structures and the first flag being included in a sequence parameter set, and a second flag indicating whether or not second reference picture list information is present in a picture header, the second flag being included in a picture parameter set; and (i) deriving the first reference picture list information by using nal_unit_type or the first flag and the second flag in the slice header, or deriving the second reference picture list information by using the second flag in the picture header, and (ii) deriving the reference picture list, based on the one or more reference picture list structures, wherein in a case that the first reference picture list is not derived, the number of entries of the one or more reference picture list structures is estimated to be 0.

A video coding method according to an aspect of the present invention is a video coding method of deriving a prediction image by using a reference picture included in a reference picture list, the video coding method at least including:

coding (i) one or more reference picture list structures, and (ii) a first flag indicating whether first reference picture list information is present in a slice header whose nal_unit_type is an IDR picture, the one or more reference picture list structures and the first flag being included in a sequence parameter set, and a second flag indicating whether or not second reference picture list information is present in a picture header, the second flag being included in a picture parameter set; and (i) deriving the first reference picture list information by using nal_unit_type or the first flag and the second flag in the slice header, or deriving the second reference picture list information by using the second flag in the picture header, and (ii) deriving the reference picture list, based on the one or more reference picture list structures, wherein in a case that the first reference picture list is not derived, the number of entries of the one or more reference picture list structures is estimated to be 0.

By adopting such a configuration, the reference picture is not made undetermined.

Advantageous Effects of Invention

According to an aspect of the present invention, the problem described above can be solved.

BRIEF DESCRIPTION OF DRAWINGS

FIG. 15 is a diagram illustrating a part of syntax of a Sequence Parameter Set (SPS) and a Picture Parameter Set (PPS).

FIG. 16 is a diagram illustrating a part of syntax of a picture header PH.

FIG. 17 is a diagram illustrating a part of syntax of a slice header.

FIG. 18 is a diagram illustrating syntax of weighted prediction information pred_weight_table.

FIG. 19 is a diagram illustrating syntax defining ref_pic_lists( ) defining the reference picture list and a reference picture list structure ref_pic_liststruct (listIdx, rplsIdx).

FIG. 20 is a diagram illustrating syntax defining the reference picture list structure ref_pic_liststruct (listIdx, rplsIdx) according to the present embodiment.

FIG. 21 is a diagram illustrating syntax of the picture header PH and the slice header according to the present embodiment.

FIG. 22 is a diagram illustrating syntax of the weighted prediction information pred_weight_table according to the present embodiment.

FIG. 23 is a diagram illustrating syntax of other weighted prediction information pred_weight_table according to the present embodiment.

FIG. 24 is a diagram illustrating syntax of the picture header and a derivation method of a variable NumRefIdxActive[i] according to the present embodiment.

FIG. 25 is a diagram illustrating syntax of the slice header and a derivation method of the variable NumRefIdxActive[i] according to the present embodiment.

FIG. 26 is a diagram illustrating syntax of other weighted prediction information pred_weight_table according to the present embodiment.

FIG. 27 is a diagram illustrating syntax of the picture header and a derivation method of the variable NumRefIdxActive[i] according to the present embodiment.

FIG. 28 is a diagram illustrating syntax of the slice header and a derivation method of the variable NumRefIdxActive[i] according to the present embodiment.

DESCRIPTION OF EMBODIMENTS

First Embodiment

Hereinafter, an embodiment of the present invention will be described with reference to the drawings.

Figure 1:
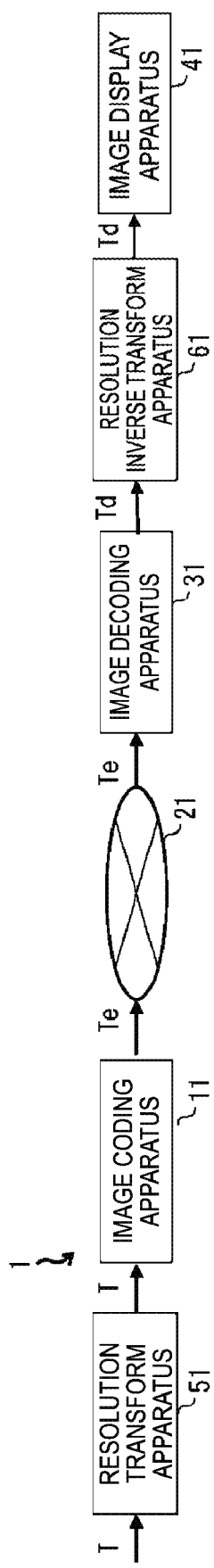
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system for transmitting the coding stream in which an image of different resolution transformed in resolution is coded, decoding the coding stream transmitted, and inversely transforming the coding stream decoded into the image with the original resolution for display. The image transmission system 1 includes a resolution transform apparatus (resolution transform unit) 51, a video coding apparatus (image coding apparatus) 11, a network 21, a video decoding apparatus (image decoding apparatus) 31, a resolution inverse transform apparatus (resolution inverse transform unit) 61, and a video display apparatus (image display apparatus) 41.

The resolution transform apparatus 51 transforms the resolution of an image T included in a video, and supplies a variable resolution video signal including the image with a different resolution to the image coding apparatus 11. The resolution transform apparatus 51 supplies, to the video coding apparatus 11, information indicating the presence or absence of resolution transform of the image. In a case that the information indicates resolution transform, the video coding apparatus sets the resolution transform information ref_pic_resampling_enabled_flag, described below, equal to 1, and includes the information in a sequence parameter set SPS (Sequence Parameter Set) of coded data for coding.

The image T with the transformed resolution is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting of the like. Furthermore, the network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted by the network 21 and generates and supplies a variable resolution decoded image signal to the resolution inverse transform apparatus 61.

In a case that the resolution transform information included in the variable resolution decoded image signal indicates resolution transform, the resolution inverse transform apparatus 61 generates a decoded image signal with the original size by inversely transforming the resolution-transformed image.

The video display apparatus 41 displays all or part of one or multiple decoded images Td indicated by the decoded image signal received from the resolution inverse transform unit. For example, the video display apparatus 41 includes a display device such as a liquid crystal display and an organic Electro-Luminescence (EL) display. Forms of the display include a stationary type, a mobile type, an HMD type, and the like. In addition, in a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || indicates a logical sum.

x?y:z is a ternary operator that takes y in a case that x is true (other than 0) and takes z in a case that x is false (0).

Clip3(a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

min (a, b) represents the smaller value of a and b.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
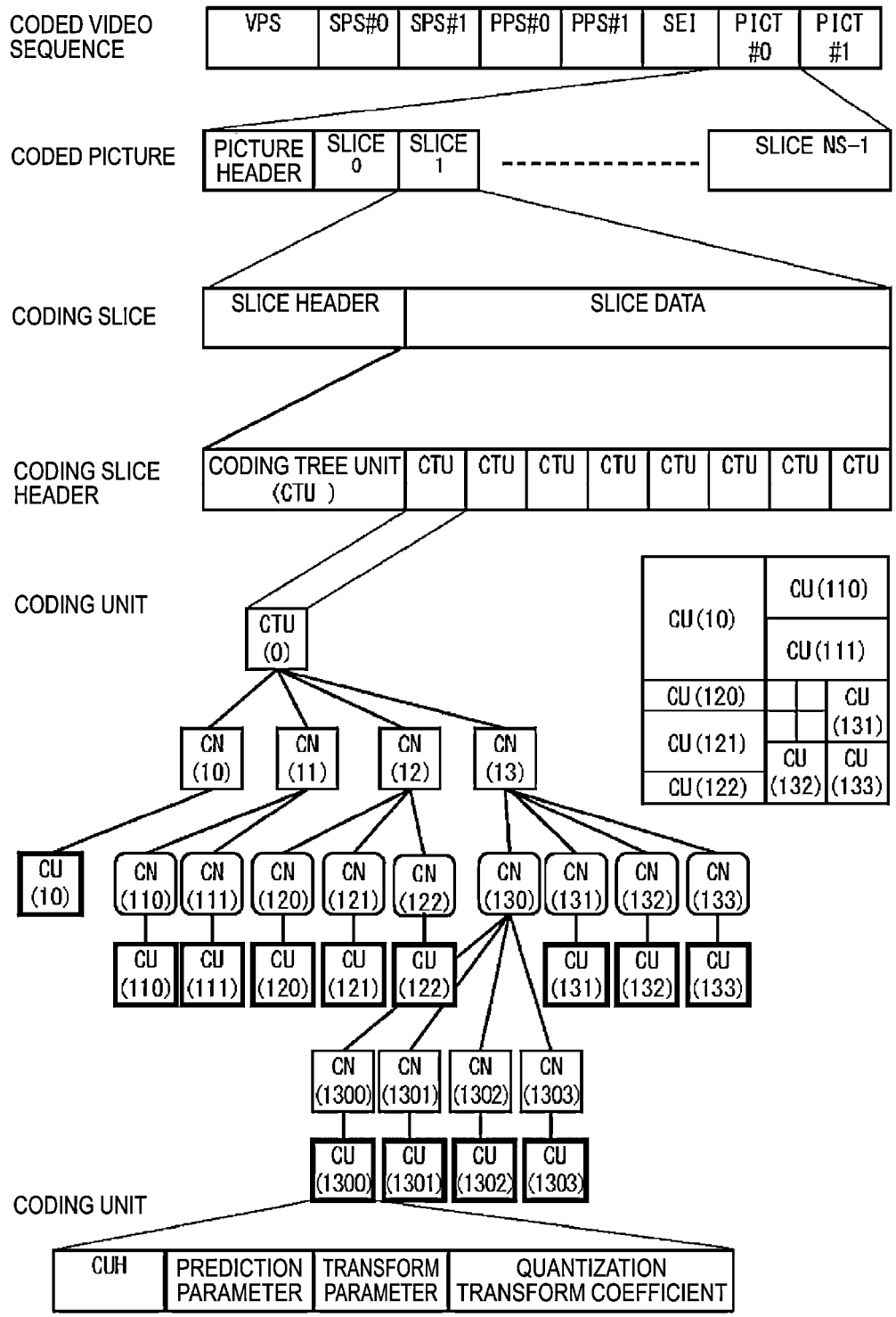
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 is a diagram illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

Coded Video Sequence

In the coded video sequence, a set of data referenced by the video decoding apparatus 31 to decode the sequence SEQ to be processed is defined. As illustrated in FIG. 4, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPS.

Here, the sequence parameter set SPS includes the following syntax.

ref_pic_resampling_enabled_flag: A flag specifying whether to use a function of making the resolution variable (resampling) in a case of decoding images included in a single sequence referencing a target SPS. From another aspect, the flag indicates that the size of the reference picture referenced in the generation of the prediction image changes between the images indicated by the single sequence. In a case that the value of the flag is 1, the above resampling is applied, and in a case that the value is 0, the resampling is not applied.

pic_width_max_in_luma_samples: A syntax indicating, in units of luminance blocks, the width of one of the images in a single sequence, the image having the largest width. The syntax has a value that is not 0 and that is an integer multiple of Max(8, MinCbSizeY).

Here, MinCbSizeY is a value determined by the minimum size of the luminance block.

pic_height_max_in_luma_samples: A syntax indicating, in units of luminance blocks, the height of one of the images in a single sequence, the image having the largest height. The syntax has a value that is not 0 and that is an integer multiple of Max(8, MinCbSizeY).

sps_temporal_mvp_enabled_flag: A flag specifying whether to use a temporal motion vector prediction in the case of decoding a target sequence. In a case that the value of the flag is 1, the temporal motion vector prediction is used, and in a case that the value is 0, the temporal motion vector prediction is not used. With this flag defined, in a case that reference pictures with different resolutions are referenced or in other such cases, coordinate positions to be referenced can be prevented from being misaligned.

In the picture parameter set PPS, a set of coding parameters referenced by the video decoding apparatus 31 to decode each picture in a target sequence is defined. For example, a reference value (pic_init_qp_minus26) of a quantization step size used for decoding of a picture and a flag (weighted_pred_flag) indicating an application of a weighted prediction are included. Note that multiple PPSs may exist. In that case, any of the multiple PPSs is selected from each picture in a target sequence.

Coding Slice

In the coding slice, a set of data referenced by the video decoding apparatus 31 to decode the slice S to be processed is defined. As illustrated in FIG. 4, the slice includes a slice header and slice data.

The slice header includes a coding parameter group referenced by the video decoding apparatus 31 to determine a decoding method for a target slice. Slice type specification information (slice_type) indicating a slice type is one example of a coding parameter included in the slice header.

Examples of slice types that can be indicated by the slice type indication information include (1) I slices for which only an intra prediction is used in coding, (2) P slices for which a uni-prediction (L0 prediction) or an intra prediction is used in coding, and (3) B slices for which a uni-prediction (L0 prediction using only a reference picture list 0 or L1 prediction using only a reference picture list 1), a bi-prediction, or an intra prediction is used in coding, and the like. Note that the inter prediction is not limited to a uni-prediction and a bi-prediction, and the prediction image may be generated by using a more reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes CTUs as illustrated in the coding slice header in FIG. 4. The CTU is a block of a fixed size (for example, 64×64) constituting a slice, and may be called a Largest Coding Unit (LCU).

Coding Tree Unit

In FIG. 4, a set of data is defined that is referenced by the video decoding apparatus 31 to decode the CTU to be processed. The CTU is split into coding units CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

The CT includes, as CT information, a CU split flag (split_cu_flag) indicating whether or not to perform a CT split, a QT split flag (qt_split_cu_flag) indicating whether or not to perform a QT split, an MT split flag (mtt_split_cu_flag) indicating the presence or absence of an MT split, an MT split direction (mtt_split_cu_vertical_flag) indicating a split direction of an MT split, and an MT split type (mtt_split_cu_binary_flag) indicating a split type of the MT split. split_cu_flag, qt_split_cu_flag, mtt_split_cu_vertical_flag, and mtt_split_cu_binary_flag are transmitted for each coding node.

Different trees may be used between luma and chroma. The type of the tree is represented by treeType. For example, in a case that a common tree is used for luminance (Y, cIdx=0) and chrominance (Cb/Cr, cIdx=1,2), a common single tree is represented by treeType=SINGLE_TREE. In a case that two different trees (DUAL tree) are used for luminance and chrominance, the tree of luma is represented by treeType=DUAL_TREE_LUMA, and the tree of chrominance is represented by treeType=DUAL_TREE_CHROMA.

Coding Unit

In FIG. 4, a set of data referenced by the video decoding apparatus 31 to decode the coding unit to be processed is defined. Specifically, the CU includes a CU header CUH, a prediction parameter, a transform parameter, a quantization transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantization transform coefficient may be subjected to entropy coding in units of subblock such as 4×4.

Prediction Parameter

A prediction image is derived by prediction parameters accompanying a block. The prediction parameters include prediction parameters for intra prediction and inter prediction.

The prediction parameters for inter prediction will be described below. The inter prediction parameters include prediction list utilization flags predFlagL0 and predFlagL1, reference picture indexes refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive the inter prediction parameters include an affine flag affine_flag, a merge flag merge_flag, a merge index merge_idx, and an MMVD flag mmvd_flag that are used in the merge mode, an inter prediction indicator inter_pred_idc and a reference picture index refIdxLX that are used to select a reference picture in the AMVP mode, a prediction vector index mvp_LX_idx, a difference vector mvdLX, and a motion vector precision mode amvr_mode that are used to derive a motion vector.

Figure 5:
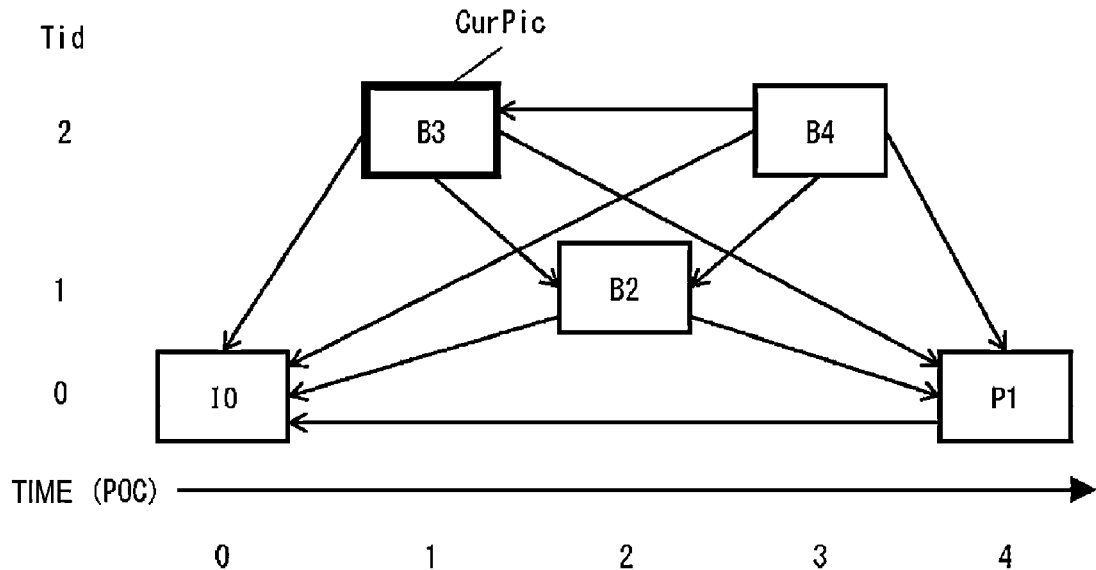
FIG. 5 is a conceptual diagram illustrating an example of reference pictures and reference picture lists.
Figure 5:
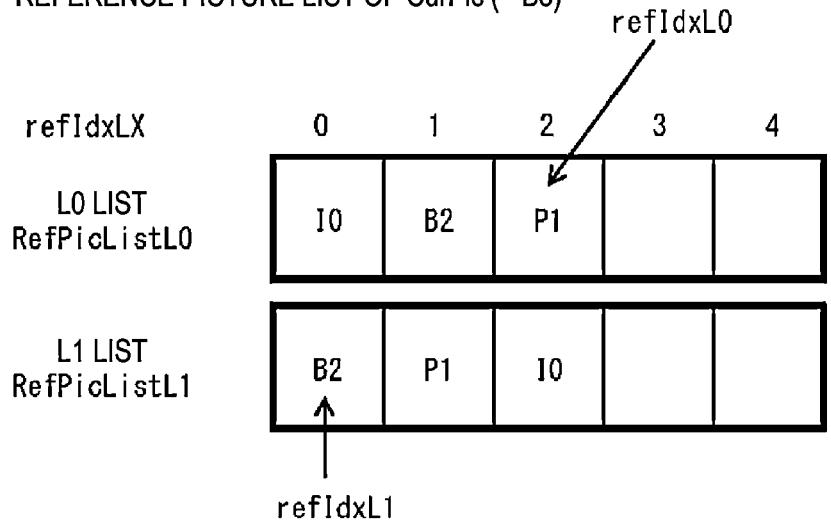

Reference Picture List A reference picture list is a list including reference pictures stored in a reference picture memory 306. FIG. 5 is a conceptual diagram illustrating an example of reference pictures and reference picture lists. In FIG. 5 corresponding to a conceptual diagram illustrating an example of reference pictures, rectangles indicates pictures, arrows indicates reference relationships among the pictures, a horizontal axis indicates time, I, P, and B in the rectangles respectively indicate an intra-picture, a uni-prediction picture, and a bi-prediction picture, and numbers in the rectangles indicate a decoding order. As illustrated, the decoding order of the pictures is I0, P1, B2, B3, and B4, and the display order is I0, B3, B2, B4, and P1. FIG. 5 illustrates an example of reference picture lists of the picture B3 (target picture). The reference picture list is a list to represent candidates of the reference pictures, and one picture (slice) may include one or more reference picture lists. In the illustrated example, the target picture B3 includes reference picture lists, i.e., an L0 list RefPicList0 and an L1 list RefPicList1. For individual CUs, which picture in a reference picture list RefPicListX (X=0 or 1) is actually referenced is specified with refIdxLX. The diagram illustrates an example of refIdxL0=2, refIdxL1=0. Note that LX is a description method used in a case of not distinguishing an L0 prediction and an L1 prediction, and in the following description, distinguishes parameters for the L0 list and parameters for the L1 list by replacing LX with L0 and L1.

Merge Prediction and AMVP Prediction A decoding (coding) method for prediction parameters include a merge prediction (merge) mode and an Advanced Motion Vector Prediction (AMVP) mode, and merge_flag is a flag to identify the modes. The merge prediction mode is a mode in which a prediction list utilization flag predFlagLX, the reference picture index refIdxLX, and a motion vector mvLX are derived from prediction parameters for neighboring blocks already processed, or the like, without being included in the coded data. The AMVP mode is a mode in which inter_pred_idc, refIdxLX, and mvLX are included in the coded data. Note that, mvLX is coded as mvp_LX_idx identifying a prediction vector mvpLX and a difference vector mvdLX. In addition to the merge prediction mode, an affine prediction mode and an MMVD prediction mode may be available.

inter_pred_idc is a value indicating the types and number of reference pictures, and takes any value of PRED_L0, PRED_L1, or PRED_BI. PRED_L0 and PRED_L1 indicate uni-predictions which use one reference picture managed in the L0 list and one reference picture managed in the L1 list, respectively. PRED_BI indicates a bi-prediction which uses two reference pictures managed in the L0 list and the L1 list.

merge_idx is an index to indicate which prediction parameter is used as a prediction parameter for the target block, among prediction parameter candidates (merge candidates) derived from blocks of which the processing is completed.

Motion Vector mvLX indicates a shift amount between blocks in two different pictures. A prediction vector and a difference vector related to mvLX are respectively referred to as mvpLX and mvdLX.

Inter Prediction Indicator Inter_Pred_Idc and Prediction List Utilization Flag predFlagLX Relationships between inter_pred_idc and predFlagL0 and predFlagL1 are as follows, and can be transformed into one another.

inter_pred_idc=(predFlagL1«1)+predFlagL0
predFlagL0=inter_pred_idc & 1
predFlagL1=inter_pred_idc»1

Note that the inter prediction parameters may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred for identifying a bi-prediction can be derived from whether two prediction list utilization flags are both 1. For example, the derivation can be performed by the following equation.

biPred=(predFlagL0==1 && predFlagL1==1)

Alternatively, biPred can be also derived from whether the inter prediction indicator is a value indicating the use of two prediction lists (reference pictures). For example, the derivation can be performed by the following equation.

biPred=(inter_pred_idc==PRED_BI)?1:0

Configuration of Video Decoding Apparatus

Figure 6:
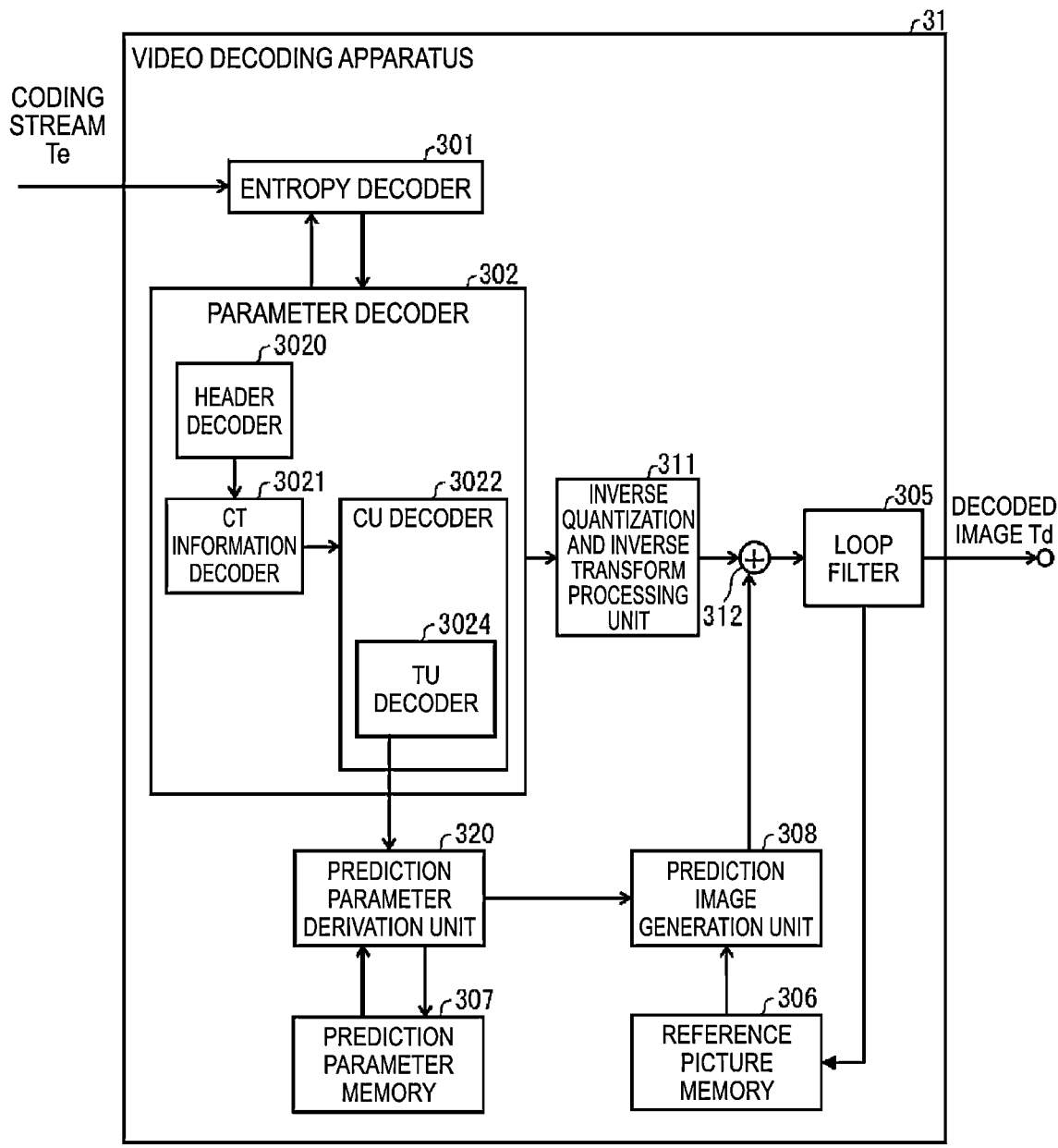
FIG. 6 is a schematic diagram illustrating a configuration of a video decoding apparatus.

The configuration of the video decoding apparatus 31 (FIG. 6) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and quantization prediction error (residual_coding) from coded data.

In the mode other than the skip mode (skip_mode=0), the TU decoder 3024 decodes QP update information and quantization prediction error from coded data. More specifically, the TU decoder 3024 decodes, in a case of skip_mode=0, a flag cu_cbp indicating whether a quantization prediction error is included in the target block, and decodes the quantization prediction error in a case that cu_cbp is 1. In a case that cu_cbp is not present in the coded data, the TU decoder 3024 derives cu_cbp as 0.

The TU decoder 3024 decodes an index mts_idx indicating a transform basis from the coded data. The TU decoder 3024 decodes, from the coded data, an index stIdx indicating the use of a secondary transformation and the transform basis. stIdx being 0 indicates non-application of the secondary transformation, stIdx being 1 indicates transformation of one of a set (pair) of secondary transform bases, and stIdx being 2 indicates transformation of the other of the pair of secondary transform bases.

The TU decoder 3024 may decode a subblock transformation flag cu_sbt_flag. In a case that cu_sbt_flag is 1, the CU is split into multiple subblocks, and for only one particular subblock, the residual is decoded. Furthermore, the TU decoder 3024 may decode the flag cu_sbt_quad_flag indicating whether the number of subblocks is 4 or 2, cu_sbt_horizontal_flag indicating a split direction, and cu_sbt_pos_flag indicating a subblock including a non-zero transform coefficient.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit 304.

Furthermore, an example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and separates and decodes individual codes (syntax elements). The entropy coding includes a scheme in which syntax elements are subjected to variable length coding by using a context (probability model) that is adaptively selected according to a type of the syntax elements and a surrounding condition, and a scheme in which syntax elements are subjected to variable length coding by using a table or a calculation expression that is determined in advance. The former CABAC (Context Adaptive Binary Arithmetic Coding) stores in memory a CABAC state of the context (the type of a dominant symbol (0 or 1) and a probability state index pStateIdx indicating a probability). The entropy decoder 301 initializes all CABAC states at the beginning of a segment (tile, CTU row, or slice). The entropy decoder 301 transforms the syntax element into a binary string (Bin String) and decodes each bit of the Bin String. In a case that the context is used, a context index ctxInc is derived for each bit of the syntax element, the bit is decoded using the context, and the CABAC state of the context used is updated.

Bits that do not use the context are decoded at an equal probability (EP, bypass), and the ctxInc derivation and CABAC state are omitted. The decoded syntax element includes prediction information for generating a prediction image, a prediction error for generating a difference image, and the like.

The entropy decoder 301 outputs the decoded codes to the parameter decoder 302. The decoded code is, for example, a prediction mode predMode, merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow of Operation

Figure 7:
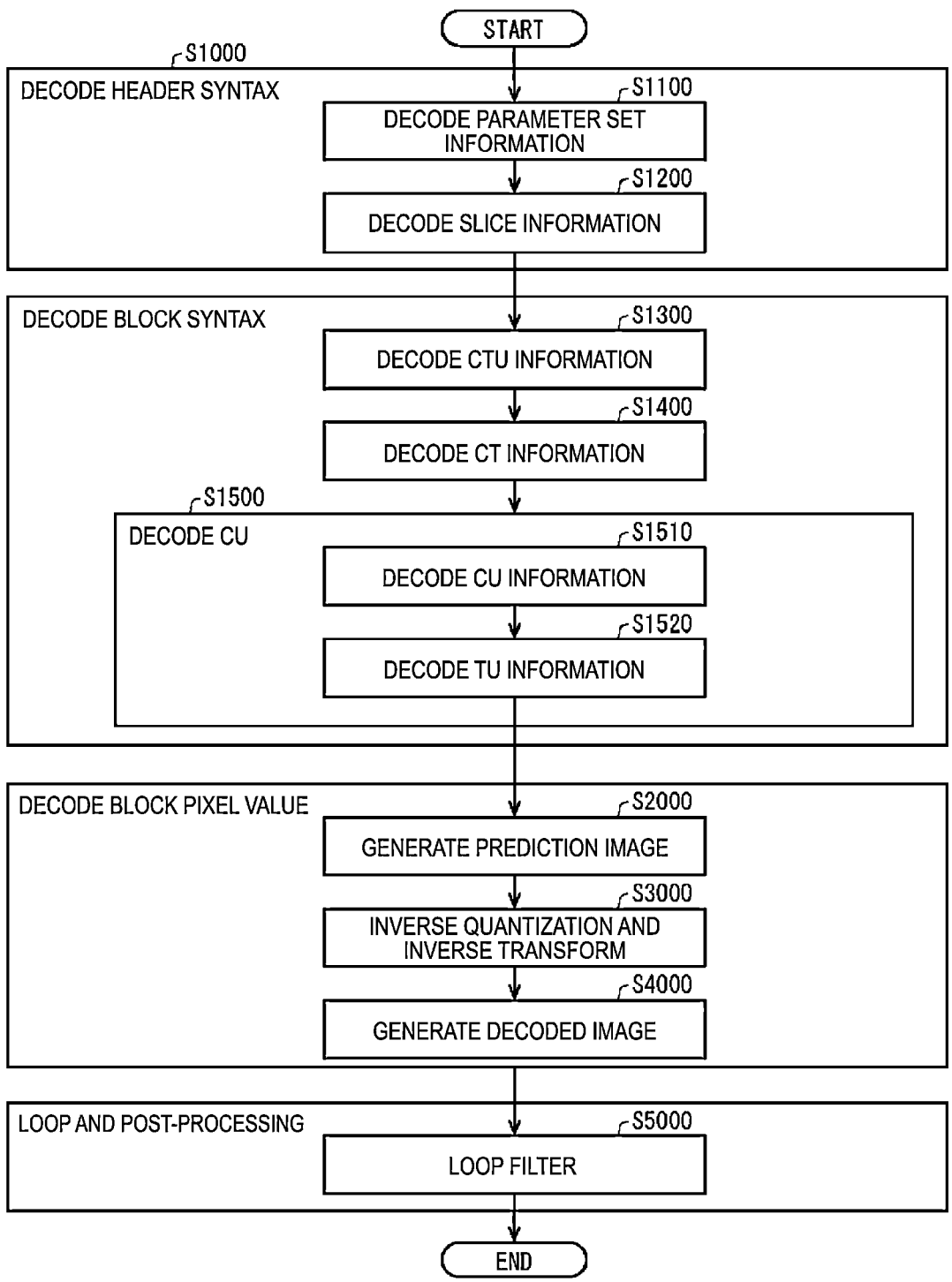
FIG. 7 is a flowchart illustrating general operation of the video decoding apparatus.

FIG. 7 is a flowchart illustrating general operation performed in the video decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes, from the coded data, QP update information and a quantization prediction error, and transform index mts_idx. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Configuration of Inter Prediction Parameter Derivation Unit

Figure 9:
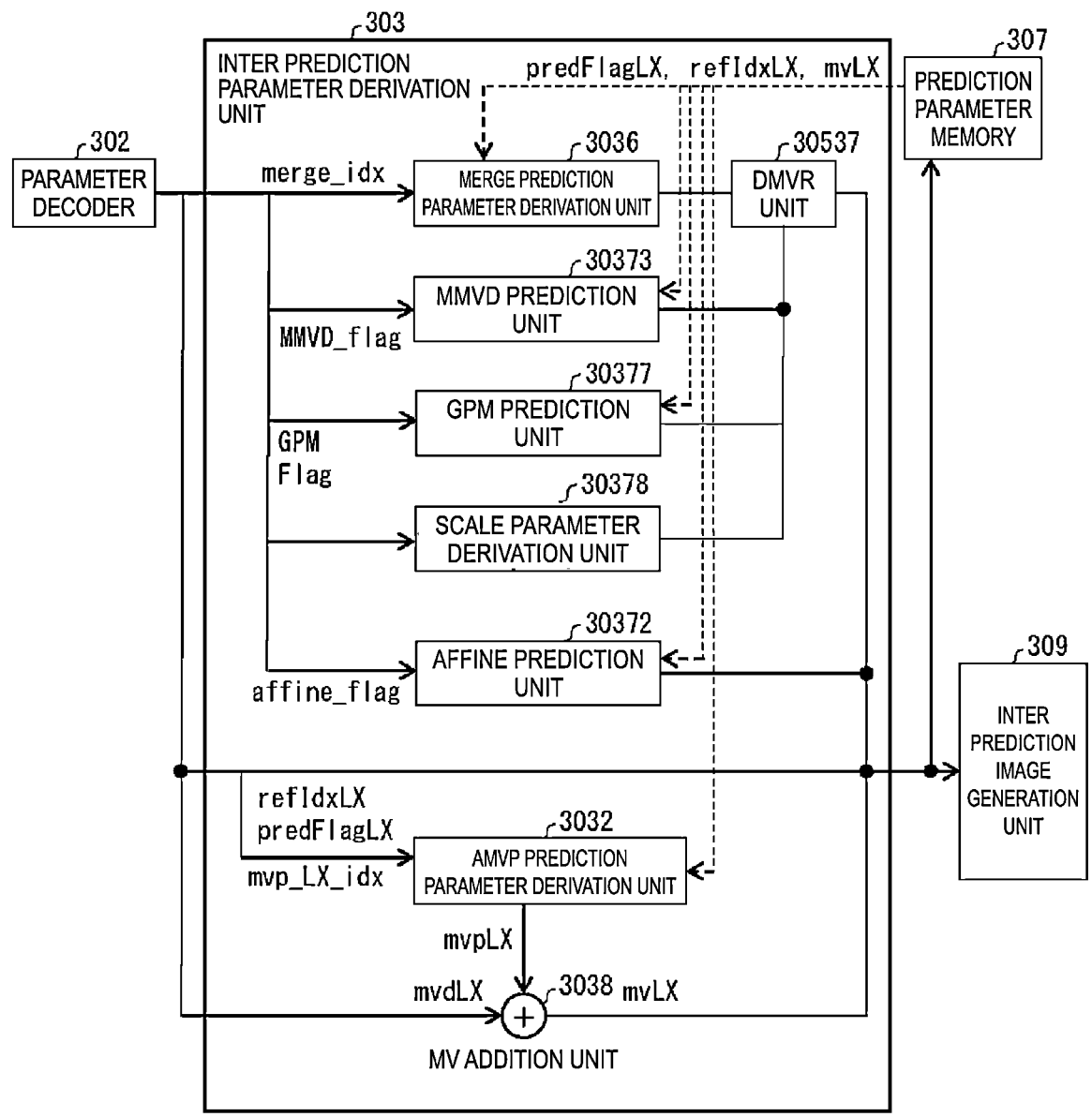
FIG. 9 is a schematic diagram illustrating a configuration of an inter prediction parameter derivation unit.

FIG. 9 is a schematic diagram illustrating a configuration of the inter prediction parameter derivation unit 303 according to the present embodiment. The inter prediction parameter derivation unit 303 derives an inter prediction parameter with reference to the prediction parameters stored in the prediction parameter memory 307, based on the syntax element input from the parameter decoder 302. The inter prediction parameter derivation unit 303 outputs the inter prediction parameter to the inter prediction image generation unit 309 and the prediction parameter memory 307. The following are means shared by the video coding apparatus and the video decoding apparatus, and may thus be collectively referred to as a motion vector derivation unit (motion vector derivation apparatus): the inter prediction parameter derivation unit 303 and the internal elements of the inter prediction parameter derivation unit 303 including an AMVP prediction parameter derivation unit 3032, a merge prediction parameter derivation unit 3036, an affine prediction unit 30372, and an MMVD prediction unit 30373, a GPM prediction unit 30377, a DMVR unit 30537, and an MV addition unit 3038.

The scale parameter derivation unit 30378 derives the scaling ratio in the horizontal direction of the reference picture RefPicScale[i][j][0], the scaling ratio in the vertical direction of the reference picture RefPicScale[i][j][1], and RefPicIsScaled[i][j] indicating whether the reference picture is scaled. Here, with i indicating whether the reference picture list is an L0 list or an L1 list, and j being the value of the L0 reference picture list or the L1 reference picture list, the derivation is performed as follows.

RefPicScale[i][j][0]=((fRefWidth«14)+(PicOutputWidthL»1))/PicOutputWidthL
RefPicScale[i][j][1]=((fRefHeight«14)+(PicOutputHeightL»1))/PicOutputHeightL
RefPicIsScaled[i][j]=(RefPicScale[i][j][0]  !=(1«14))∥(RefPicScale[i][j][1] !=(1«14))

Here, the variable PicOutputWidthL is a value obtained in a case that the scaling ratio in the horizontal direction is calculated in a case that the coded picture is referenced, and is obtained by subtracting a left offset value and a right offset value from the number of pixels in the horizontal direction of the luminance of the coded picture. The variable PicOutputHeightL is a value obtained in a case that the scaling ratio in the vertical direction is calculated in a case that the coded picture is referenced, and is obtained by subtracting a top offset value and a bottom offset value from the number of pixels in the vertical direction of the luminance of the coded picture. The variable fRefWidth is the value of PicOutputWidthL of the reference picture of the reference picture list value j in the list i, and the variable fRefHight is the value of PicOutputHeightL of the reference picture of the reference picture list value j in the list i.

In a case that the affine_flag indicates 1, that is, the affine prediction mode, the affine prediction unit 30372 derives the inter prediction parameters in subblock units.

In a case that the mmvd_flag indicates 1, that is, the MMVD prediction mode, the MMVD prediction unit 30373 derives an inter prediction parameter from the merge candidate and the difference vector derived by the merge prediction parameter derivation unit 3036.

In a case that GPM Flag indicates 1, that is, a Geometric Partitioning Mode (GPM) prediction mode, the GPM prediction unit 30377 derives a GPM prediction parameter.

In a case that merge_flag indicates 1, that is, the merge prediction mode, merge_idx is derived and output to the merge prediction parameter derivation unit 3036.

In a case that the merge_flag indicates 0, that is, the AMVP prediction mode, the AMVP prediction parameter derivation unit 3032 derives mvpLX from inter_pred_idc, refIdxLX, or mvp_LX_idx.

MV Addition Unit

In the MV addition unit 3038, mvpLX and mvdLX derived are added together to derive mvLX.

Affine Prediction Unit The affine prediction unit 30372 derives 1) motion vectors for two control points CP0, CP1 or three control points CP0, CP1, CP2 of the target block, 2) derive affine prediction parameters for the target block, and 3) derives a motion vector for each subblock from the affine prediction parameter.

In the case of merge affine prediction, a motion vector cpMvLX[ ] for each control point CP0, CP1, CP2 is derived from a motion vector for an adjacent block of the target block. In the case of inter affine prediction, cpMvLX[ ] for each control point is derived from the sum of the prediction vector for each control point CP0, CP1, CP2 and the difference vector mvdCpLX[ ] derived from the coded data.

Merge Prediction

Figure 10:
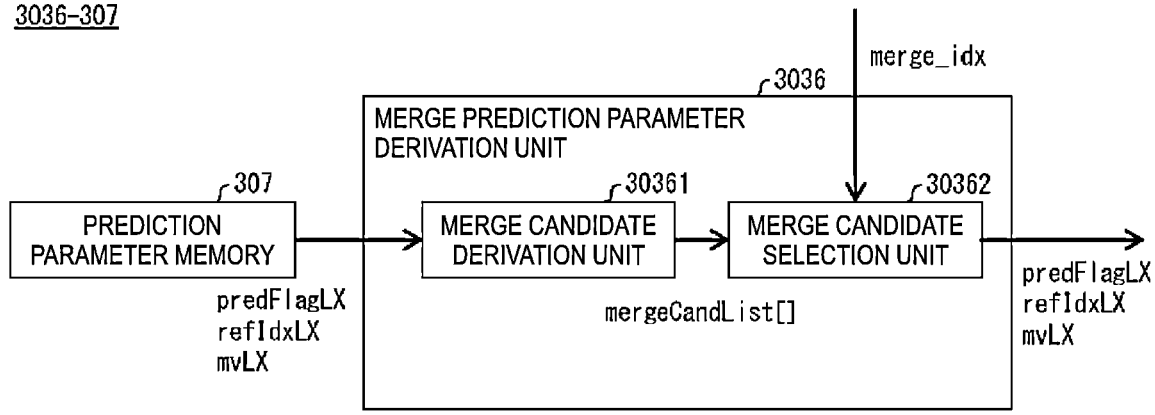
FIG. 10 is a schematic diagram illustrating a configuration of a merge prediction parameter derivation unit and an AMVP prediction parameter derivation unit.
Figure 10:
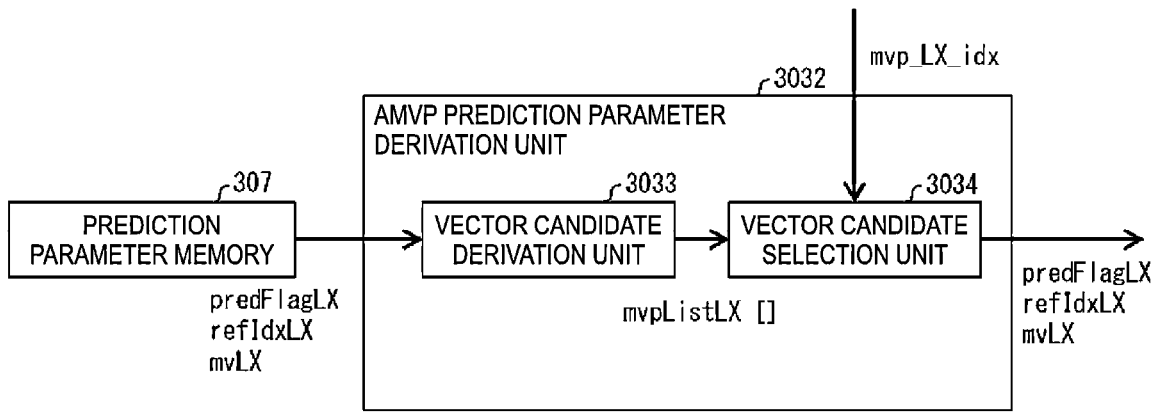

FIG. 10 is a schematic diagram illustrating a configuration of the merge prediction parameter derivation unit 3036 according to the present embodiment. The merge prediction parameter derivation unit 3036 includes a merge candidate derivation unit 30361 and a merge candidate selection unit 30362. Note that a merge candidate includes the prediction parameter (predFlagLX, mvLX, and refIdxLX) and is stored in the merge candidate list. The merge candidate stored in the merge candidate list is assigned an index in accordance with a prescribed rule.

The merge candidate derivation unit 30361 derives the merge candidate using the motion vector and refIdxLX for the decoded adjacent block without any change. In addition, the merge candidate derivation unit 30361 may apply spatial merge candidate derivation processing, temporal merge candidate derivation processing, pairwise merge candidate derivation processing, and zero merge candidate derivation processing described below.

As the spatial merge candidate derivation processing, the merge candidate derivation unit 30361 reads the prediction parameter stored in the prediction parameter memory 307 in accordance with a prescribed rule, and configures the prediction parameter in a merge candidate. A reference picture specification method is, for example, a prediction parameter related to each of the adjacent blocks located within a prescribed range from the target block (e.g., all or some of a block A1 on the left of and share the boarder with the target block, a block B1 on the right of and share the boarder with the target block, a block B0 at the upper right of and tangent to the target block, a block A0 at the lower left of and tangent to the target block, and a block B2 at the upper left of and tangent to the target block). The merge candidates are referred to as A1, B1, B0, A0, and B2.

In this regard, A1, B1, B0, A0, and B2 are motion information derived from blocks including the following coordinates. In the target picture in FIG. 8, the positions of A1, B1, B0, A0, and B2 are illustrated in the arrangement of the merge candidates.

$A1: (xCb-1, yCb+cbHeight-1)$ $B1: (xCb+cbWidth-1, yCb-1)$ $B0: (xCb+cbWidth, yCb-1)$ A0:(xCb−1,yCb+cbHeight)

B2:(xCb−1,yCb−1)

The target block has upper left coordinates (xCb, yCb), a width cbWidth, and a height cbHeight.

Figure 8:
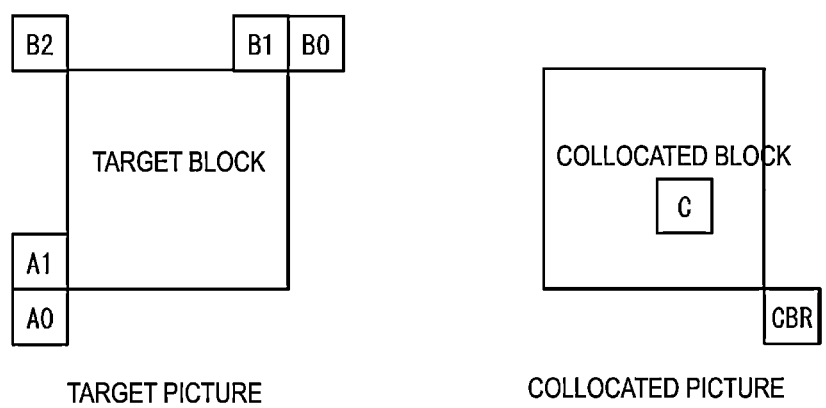
FIG. 8 is a diagram illustrating arrangement of merge candidates.

As temporal merge derivation processing, the merge candidate derivation unit 30361 reads, from the prediction parameter memory 307, the prediction parameter for a block C in the reference image including the lower right coordinates CBR or the center coordinates of the target block, specifies the block C as a merge candidate Co1, and stores the block C in the merge candidate list mergeCandList[ ], as illustrated in the collocated picture in FIG. 8.

In general, the block CBR is preferentially added to mergeCandList [ ], and in a case that the CBR does not have a motion vector (e.g., an intra prediction block) or that the CBR is located outside the picture, then the motion vector of the block C is added to the prediction vector candidates. By adding, as a prediction candidate, a motion vector of a collocated block that is likely to move differently, the number of selections of the prediction vector is increased, enhancing coding efficiency.

In a case that ph_temporal_mvp_enabled_flag is 0 or cbWidth*cbHeight is less than or equal to 32, then a collocated motion vector mvLXCol of the target block is set equal to 0, and an availability flag availableFlagLXCol of the collocated block is set equal to 0.

Otherwise (in a case that SliceTemporalMvpEnabledFlag is 1), the following is performed.

For example, the merge candidate derivation unit 30361 may derive the position of the C (xColCtr, yColCtr) and the position of the CBR (xColCBr, yColCBr) by using the following equation.

xColCtr=xCb+(cbWidth»1)

yColCtr=yCb+(cbHeight»1)

xColCBr=xCb+cbWidth yColCBr=yCb+cbHeight

In a case that the CBR is available, the motion vector of the CBR is utilized to derive a merge candidate COL. In a case that the CBR is not available, the C is used to derive the COL.

Then, availableFlagLXCol is set equal to 1. Note that the reference picture may be a collocated_ref_idx signaled in the slice header.

The pairwise candidate derivation unit derives a pairwise candidate avgK from the average of the two merge candidates (p0Cand and p1Cand) stored in mergeCandList and stores the pairwise candidate avgK in mergeCandList[ ].

mvLXavgK[0]=(mvLXp0Cand[0]+mvLXp1Cand[0])/2 mvLXavgK[1]=(mvLXp0Cand[1]+mvLXp1Cand[1])/2

The merge candidate derivation unit 30361 derives zero merge candidates Z0, . . . , ZM in which refIdxLX is 0 . . . M and in which an X component and a Y component of mvLX are both 0, and store the zero merge candidates in the merge candidate list.

The storage in mergeCandList[ ] is in the order of, for example, spatial merge candidates (A1, B1, B0, A0, and B2), the temporal merge candidate Co1, the pairwise merge candidate avgK, and the zero merge candidate ZK. Note that a reference block that is not available (intra prediction block, or the like) is not stored in the merge candidate list.

i=0
if(availableFlagA1)
  mergeCandList[i++]=A1
if(availableFlagB1)
  mergeCandList[i++]=B1
if(availableFlagB0)
  mergeCandList[i++]=B0
if(availableFlagA0)
  mergeCandList[i++]=A0
if(availableFlagB2)
  mergeCandList[i++]=B2
if(availableFlagCo1)
  mergeCandList[i++]=Co1
if(availableFlagAvgK)
  mergeCandList[i++]=avgK
if(i<MaxNumMergeCand)
  mergeCandList[i++]=ZK The merge candidate selection unit 30362 selects a merge candidate N indicated by merge_idx out of the merge candidates included in the merge candidate list, using the following equation.

N=mergeCandList[merge_idx]Here, N is a label indicating a merge candidate, and takes A1, B1, B0, A0, B2, Co1, avgK, ZK, and the like. The motion information of the merge candidate indicated by the label N is indicated by (mvLXN[0], mvLXN[0]), predFlagLXN, and refIdxLXN.

(mvLXN[0], mvLXN[0]), predFlagLXN, and refIdxLXN selected are selected as inter prediction parameters for the target block. The merge candidate selection unit 30362 stores the inter prediction parameter for the selected merge candidate in the prediction parameter memory 307 and outputs the inter prediction parameter to the inter prediction image generation unit 309.

DMVR

Now, a Decoder side Motion Vector Refinement (DMVR) processing performed by the DMVR unit 30375 will be described. In a case that the merge_flag is 1 or the skip flag skip_flag is 1 for the target CU, the DMVR unit 30375 modifies mvLX of the target CU derived by the merge prediction unit 30374 by using the reference image. Specifically, in a case that the prediction parameter derived by the merge prediction unit 30374 indicates bi-prediction, the motion vector is modified by using the prediction image derived from the motion vector corresponding to two reference pictures. mvLX modified is supplied to the inter prediction image generation unit 309.

In the derivation of the flag dmvrFlag specifying whether to perform DMVR processing, one of multiple conditions for setting dmvrFlag equal to 1 is that the value of RefPicIsScaled[0][refIdxL0] described above is 0 and the value of RefPicIsScaled[1][refIdxL1]described above is 0. In a case that the value of dmvrFlag is set equal to 1, the DMVR unit 30375 performs DMVR processing.

In the derivation of the flag dmvrFlag specifying whether to perform DMVR processing, ciip_flag is 0, that is, no application of IntraInter combining processing, is included as one of the multiple conditions for setting dmvrFlag equal to 1.

In the derivation of the flag dmvrFlag specifying whether to perform DMVR processing, one of the multiple conditions for setting dmvrFlag equal to 1 is that luma_weight_l0_flag[i] is 0, luma_weight_l0_flag[i] corresponding to a flag indicating whether coefficient information for a weighted prediction of an L0 prediction of luminance described below is present, and that the value of luma_weight_l1_flag[i] is 0, luma_weight_l1_flag[i] corresponding to a flag indicating whether coefficient information for a weighted prediction of an L1 prediction of luminance described below is present. In a case that the value of dmvrFlag is set equal to 1, the DMVR unit 30375 performs DMVR processing.

Note that, in the derivation of the flag dmvrFlag specifying whether to perform DMVR processing, one of the multiple conditions for setting dmvrFlag equal to 1 may be that luma_weight_l0_flag[i] is 0 and the value of luma_weight_l1_flag[i] is 0 and that chroma_weight_l0_flag[i] is 0, chroma_weight_l0_flag[i] corresponding to a flag indicating whether coefficient information for a weighted prediction of an L0 prediction of chrominance described below is present, and that the value of chroma_weight_l1_flag[i] is 0, chroma_weight_l1_flag[i] corresponding to a flag indicating whether coefficient information for a weighted prediction of an L1 prediction of chrominance described below is present. In a case that the value of dmvrFlag is set equal to 1, the DMVR unit 30375 performs DMVR processing.

(Prof)

In a case that the value of RefPicIsScaled[0][refIdxLX] is 1 or the value of RefPicIsScaled[1][refIdxLX] is 1, the value of cbProfFlagLX is set equal to FALSE. Here, cbProfFlagLX is a flag that specifies whether to perform Prediction refinement (PROF) of the affine prediction.

AMVP Prediction

FIG. 10 is a schematic diagram illustrating a configuration of the AMVP prediction parameter derivation unit 3032 according to the present embodiment. The AMVP prediction parameter derivation unit 3032 includes a vector candidate derivation unit 3033 and a vector candidate selection unit 3034. The vector candidate derivation unit 3033 derives a prediction vector candidate from the motion vector for the decoded adjacent block stored in the prediction parameter memory 307 based on refIdxLX, and stores the result in a prediction vector candidate list mvpListLX[ ].

The vector candidate selection unit 3034 selects a motion vector mvpListLX[mvp_LX_idx] indicated by mvp_LX_idx, among the prediction vector candidates of the prediction vector candidate list mvpListLX[ ], as mvpLX. The vector candidate selection unit 3034 outputs mvpLX selected to the MV addition unit 3038.

MV Addition Unit

The MV addition unit 3038 adds mvpLX input from the AMVP prediction parameter derivation unit 3032 and mvdLX decoded, to calculate mvLX. The addition unit 3038 outputs mvLX calculated to the inter prediction image generation unit 309 and the prediction parameter memory 307.

mvLX[0]=mvpLX[0]+mvdLX[0]

mvLX[1]=mvpLX[1]+mvdLX[1]

Detailed Classification of Subblock Merge

An overview of the types of prediction processing associated with subblock merge will be provided. As described above, the types of prediction processing associated with subblock merge is roughly divided into a merge prediction and an AMVP prediction.

The merge prediction is further classified as follows.
  Normal merge prediction (block-based merge prediction)
  Subblock merge prediction
    The subblock merge predictions is further classified as follows.
    Subblock prediction (ATMVP)
    Affine prediction
      Inferred affine prediction
      Constructed affine prediction
  On the other hand, the AMVP prediction is classified as follows.
  AMVP (translation)
  MVD affine prediction
    The MVD affine prediction is further classified as follows.
    4 parameter MVD affine prediction
    6 parameter MVD affine prediction Note that the MVD affine prediction refers to an affine prediction in which a difference vector is decoded for use.

In the subblock prediction, as in the temporal merge derivation processing, the availability availableFlagSbCol of the collocated subblock COL of the target subblock is determined, and in a case that the collocated subblock is available, the prediction parameter is derived. At least in a case that SliceTemporalMvpEnabledFlag described above is 0, availableFlagSbCol is set equal to 0.

The Merge with Motion Vector Difference (MMVD) prediction may be classified as a merge prediction or as an AMVP prediction. In the former case, mmvd_flag and MMVD-related syntax elements are decoded in a case of merge_flag=1. In the latter case, mmvd_flag and the MMVD-related syntax elements are decoded in a case of merge_flag=0.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU in a predefined position for each target picture and target CU.

The prediction parameter memory 307 stores the prediction parameter in a predefined position for each CTU or CU. Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308. In addition, the prediction image generation unit 308 reads a reference picture from the reference picture memory 306. The prediction image generation unit 308 generates a prediction image of a block or a subblock by using the parameters and the reference picture (reference picture block) in the prediction mode indicated by predMode. Here, the reference picture block refers to a set of pixels (referred to as a block because they are normally rectangular) on a reference picture and is a region that is referenced for generating a prediction image.

Inter Prediction Image Generation Unit 309

In a case that predMode indicates the inter prediction mode, the inter prediction image generation unit 309 generates a prediction image of a block or a subblock by inter prediction by using the inter prediction parameters input from the inter prediction parameter derivation unit 303 and the read reference picture.

Figure 11:
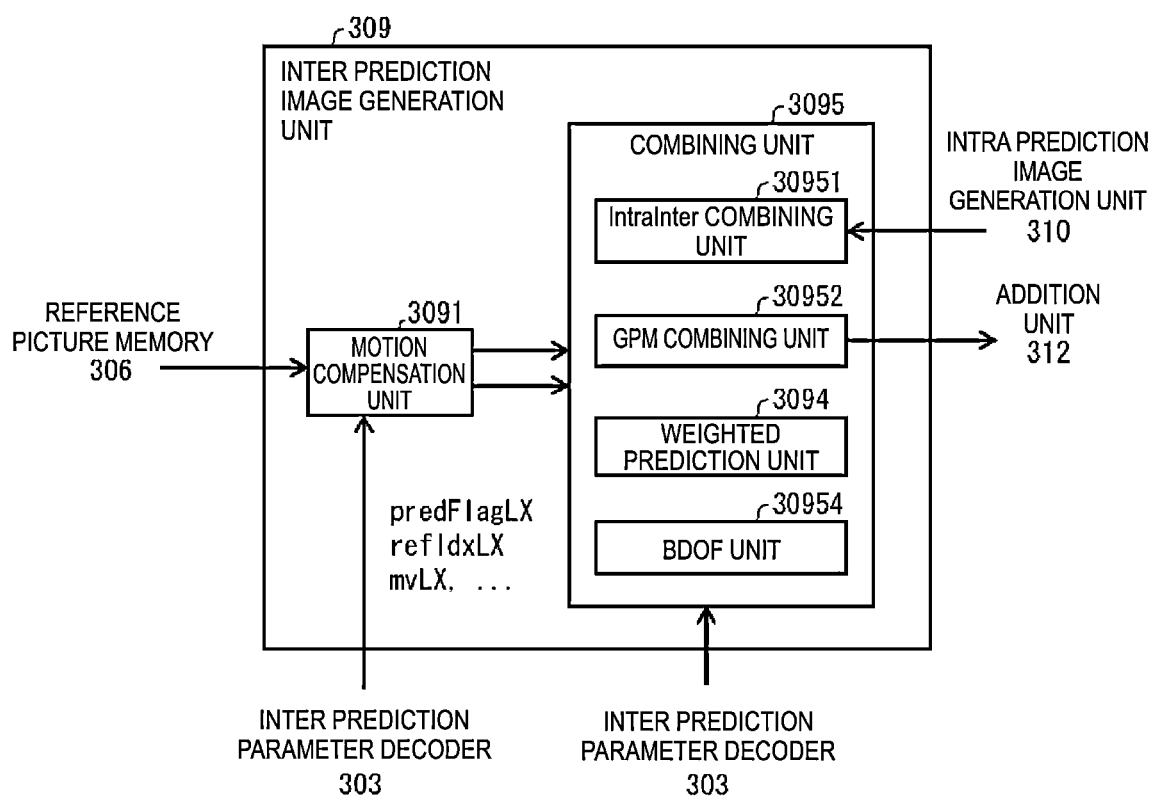
FIG. 11 is a schematic diagram illustrating a configuration of an inter prediction image generation unit.

FIG. 11 is a schematic diagram illustrating the configuration of the inter prediction image generation unit 309 included in the prediction image generation unit 308 according to the present embodiment. The inter prediction image generation unit 309 includes a motion compensation unit (prediction image generation unit) 3091 and a combining unit 3095. The combining unit 3095 includes an IntraInter combining unit 30951, a GPM combining unit 30952, a BDOF unit 30954, and a weighted prediction unit 3094.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, mvLX) input from the inter prediction parameter derivation unit 303. The reference block is a block located on the reference picture RefPicLX designated by refIdxLX, at a position shifted by mvLX from the position of the target block. Here, in a case that mvLX does not have an integer precision, an interpolation image is generated by using a filter referred to as a motion compensation filter and configured to generate pixels at fractional positions.

The motion compensation unit 3091 first derives an integer position (xInt, yInt) and a phase (xFrac, yFrac) corresponding to in-prediction block coordinates (x, y) by the following equation.

$$xInt=xPb+(mvLX[0]\gg(\log 2(MVPREC)))+$$
$$xxFrac=mvLX[0]\&(MVPREC-1)$$

$$yInt=yPb+(mvLX[1]\gg(\log 2(MVPREC)))+$$
$$yyFrac=mvLX[1]\&(MVPREC-1)$$

Here, (xPb, yPb) indicates the upper left coordinates of a block with a bW*bH size, that is, x=0 ... bW−1, y=0 ... bH−1, and MVPREC indicates the precision of the motion vector mvLX (1/MVPREC pixel precision). For example, MVPREC=16.

The motion compensation unit 3091 derives a temporary image temp[ ][ ] by performing horizontal interpolation processing on a reference picture refImg using an interpolation filter. In the equation below, Σ is the sum related to k of k=0, ..., NTAP−1, shift1 is a normalization parameter for adjusting a value range, and offset1=1«(shift1−1).

$$temp[x][y]=(\Sigma mcFilter[xFrac][k]*refImg[xInt+k-NTAP/2+1][yInt]+offset1)\gg shift1$$

Subsequently, the motion compensation unit 3091 derives an interpolation image Pred[ ][ ] by performing vertical interpolation processing on the temporary image temp[ ][ ]. In the equation below, Σ is the sum related to k of k=0, ..., NTAP−1, shift2 is a normalization parameter for adjusting a value range, and offset2=1«(shift2−1).

$$Pred[x][y]=(\Sigma mcFilter[yFrac][k]*temp[x][y+k-NTAP/2+1]+offset2)\gg shift2$$

Note that, in a case of bi-prediction, above Pred[ ][ ] is derived for each of the L0 list and the L1 list (referred to as interpolation images PredL0[ ][ ] and PredL1[ ][ ]), and the interpolation image Pred[ ][ ] is generated from PredL0[ ][ ] and PredL1[ ][ ].

Note that the motion compensation unit 3091 has a function of scaling an interpolation images in accordance with the scaling ratio in the horizontal direction RefPicScale[i][j][0] of the reference picture derived by the scale parameter derivation unit 30378, and the scaling ratio in the vertical direction RefPicScale[i][j][1] of the reference picture.

The combining unit 3095 includes the IntraInter combining unit 30951, the GPM combining unit 30952, the weighted prediction unit 3094, and the BDOF unit 30954.

Interpolation Filter Processing

Interpolation filter processing, that is performed by the prediction image generation unit 308, in a case that the resampling described above is applied to change the size of the reference picture within a single sequence, will be described below. Note that this processing may be performed by, for example, the motion compensation unit 3091.

The prediction image generation unit 308 switches multiple filter coefficients and performs the interpolation filter processing in a case that the value of RefPicIsScaled[i][j] received from the inter prediction parameter derivation unit 303 indicates that the reference picture is scaled.

IntraInter Combining Processing

The IntraInter combining unit 30951 generates a prediction image through the weighted sum of an inter prediction image and an intra prediction image.

In a case that the flag ciip_flag indicating whether to apply the IntraInter combining processing is 1, a pixel value predSamplesComb[x][y] of the prediction image is derived as follows.

$$predSamplesComb[x][y]=(w*predSamplesIntra[x][y]+(4-w)*predSamplesInter[x][y]+2)\gg 2$$

Here, predSamplesIntra[x][y] is the intra prediction image, and is limited to planar prediction. predSamplesInter[x][y] is a reconfigured inter prediction image.

A weight w is derived as follows.

In a case that both of the lowermost block adjoining the target coding block on the left side and the rightmost block adjoining the target coding block on the upper side are intra, w is set equal to 3.

In other cases, in a case that both of the lowermost block adjoining the target coding block on the left side and the rightmost block adjoining the target coding block on the upper side are not intra, w is set equal to 1.

Otherwise, w is set equal to 2.

GPM Combining Processing

The GPM combining unit 30952 generates the prediction image using the GPM prediction described above.

BDOF Prediction

Now, the details of a Bi-Directional Optical Flow (BDOF processing, BDOF) prediction performed by the BDOF unit 30954 will be described. In a bi-prediction mode, the BDOF unit 30954 generates a prediction image with reference to two prediction images (first prediction image and second prediction image) and a gradient correction term.

Weighted Prediction

The weighted prediction unit 3094 generates a prediction image pbSamples of the block from an interpolation image predSamplesLX.

First, the variable weightedPredFlag indicating whether to perform the weighted prediction processing is derived as follows. In a case that slice_type is equal to P, weightedPredFlag is set equal to pps_weighted_pred_flag defined by the PPS. Otherwise, in a case that slice_type is equal to B, weightedPredFlag is set equal to pps_weighted_bipred_flag && (!dmvrFlag) defined by the PPS.

Hereinafter, bcw_idx is the weight index of a bi-prediction with weights in units of CU. In a case that bcw_idx is not signaled, then bcw_idx=0 is set. For bcwIdx, the bcwIdxN of a neighboring block is set in the merge prediction mode, and the bcw_idx of the target block is set in the AMVP prediction mode.

In a case that the value of the variable weightedPredFlag is equal to 0 or that the value of the variable bcwIdx is 0, then the normal prediction image processing is performed, and the prediction image pbSamples is derived as follows.

In a case that one of prediction list utilization flags (predFlagL0 or predFlagL1) is 1 (uni-prediction) (no weighted prediction is used), processing in accordance with the equation below is performed in which predSamplesLX (LX is L0 or L1) is adapted to the number of pixel bits bitDepth.

$$pbSamples[x][y]=Clip3(0,(1\ll bitDepth)-1,(predSamplesLX[x][y]+offset1)\gg shift1)$$

Here, shift1=14−bitDepth, offset1=1≪(shift1−1) are established. PredLX is an interpolation image of the L0 or L1 prediction.

In a case that both of prediction list utilization flags (predFlagL0 and predFlagL1) are 1 (bi-prediction PRED_BI) and that no weighted prediction is used, processing in accordance with the equation below is executed in which predSamplesL0 and predSamplesL1 are averaged and adapted to the number of pixel bits.

$$pbSamples[x][y]=Clip3(0,(1\ll bitDepth)-1,(predSamplesL0[x][y]+predSamplesL1[x][y]+offset2)\gg shift2)$$

Here, shift2=15−bitDepth, offset2=1≪(shift2−1) are established.

In a case that the value of the variable weightedPredFlag is equal to 1 and that the value of the variable bcwIdx is equal to 0, then the weighted prediction processing is performed, and the prediction image pbSamples is derived as follows.

The variable shift1 is set equal to Max(2, 14-bitDepth). The variables log 2Wd, o0, o1, w0, and w1 are derived as follows.

In a case that cIdx is 0, corresponding to luminance, then the following applies.

$$\log 2Wd = luma\_log 2\_weight\_denom + shift1$$

w0=LumaWeightL0[refIdxL0]
w1=LumaWeightL1[refIdxL1]
o0=luma_offset_l0[refIdxL0]≪(bitDepth−8)
o1=luma_offset_l1[refIdxL1]≪(bitDepth−8)

Otherwise (cIdx is a chrominance not equal to 0), the following applies.

$$\log 2Wd = ChromaLog2WeightDenom + shift1$$

w0=ChromaWeightL0[refIdxL0][cIdx−1]
w1=ChromaWeightL1[refIdxL1][cIdx−1]
o0=ChromaOffsetL0[refIdxL0][cIdx−1]≪(bitDepth−8)
o1=ChromaOffsetL1[refIdxL1][cIdx−1]≪(bitDepth−8)

The pixel value pbSamples [x] [y] of the prediction image with x=0, . . . , nCbW−1 and y=0, . . . , nCbH−1 is derived as follows.

Then, in a case that predFlagL0 is equal to 1 and that predFlagL1 is equal to 0, then the pixel value pbSamples [x][y] of the prediction image is derived as follows.

$$if(\log 2Wd>=1)\ pbSamples[x][y]=Clip3(0,(1\ll bitDepth)-1,((predSamplesL0[x][y]*w0+2^{(\log 2Wd-1)})\gg \log 2Wd)+o0)$$

else $$pbSamples[x][y]=Clip3(0,(1\ll bitDepth)-1,predSamplesL0[x][y]*w0+o0)$$

Otherwise, in a case that predFlagL0 is 0 and that predFlagL1 at 1, then the pixel value pbSamples [x] [y] of the prediction image is derived as follows.

$$if(\log 2Wd>=1)pbSamples[x][y]=Clip3(0,(1\ll bitDepth)-1,((predSamplesL1[x][y]*w1+2^{(\log 2Wd-1)})\gg \log 2Wd)+o1)$$

else $$pbSamples[x][y]=Clip3(0,(1\ll bitDepth)-1,predSamplesL1[x][y]*w1+o1)$$

Otherwise, in a case that predFlagL0 is equal to 1 and that predFlagL1 is equal to 1, then the pixel value pbSamples [x][y] of the prediction image is derived as follows.

$$pbSamples[x][y]=Clip3(0,(1\ll bitDepth)-1,(predSamplesL0[x][y]*w0+predSamplesL1[x][y]*w1+((o0+o1+1)\ll \log 2Wd))\gg (\log 2Wd+1))$$

BCW Prediction

A Bi-prediction with CU-level Weights (BCW) prediction is a prediction method enabling a predetermined weight coefficient to be switched at a CU level.

The following are input: two variables nCbW and nCbH specifying the width and height of the current coding block, two arrays predSamplesL0 and predSamplesL1 of (nCbW)× (nCbH), the flags predFlagL0 and predFlagL1 indicating whether a prediction list is used, the reference picture indexes refIdxL0 and refIdxL1, the index bcw_idx for the BCW prediction, and the variable cIdx indicating the index of each of the luminance and chrominance components. The BCW prediction processing is performed, and the pixel value of the prediction image of the array pbSamples of (nCbW)×(nCbH) is output.

In a case that sps_bcw_enabled_flag indicating whether to use the prediction at the SPS level is TURE and that the variable weightedPredFlag is 0 and that the reference picture indicated by the two reference picture indexes refIdxL0 and refIdxL1 includes no weighted prediction coefficients and that the coding block size has a given value or smaller, then bcw_idx of the syntax at the CU level is explicitly signaled, and the variable bcwIdx is set equal to the value of bcw_idx. In a case that bcw_idx is absent, then the variable bcwIdx is set equal to 0.

In a case that the variable bcwIdx is 0, the pixel value of the prediction image is derived as follows.

$$pbSamples[x][y]=Clip3(0,(1\ll bitDepth)-1,(predSamplesL0[x][y]+predSamplesL1[x][y]+offset2)\gg shift2)$$

Otherwise (in a case that bcwIdx is not equal to 0), the following applies.

The variable w1 is set equal to bcwWLut[bcwIdx]. bcwWLut[k]={4, 5, 3, 10, −2}.

The variable w0 is set equal to (8−w1). The pixel value of the prediction image is derived as follows.

$$pbSamples[x][y]=Clip3(0,(1\ll bitDepth)-1,(w0*predSamplesL0[x][y]+w1*predSamplesL1[x][y]+offset3)\gg (shift2+3))$$

In a case that the BCW prediction is used in the AMVP prediction mode, the inter prediction parameter decoder 303 decodes bcw_idx and transmits decoded bcw_idx to the BCW unit 30955. In a case that the BCW prediction is used in the merge prediction mode, the inter prediction parameter decoder 303 decodes the merge index merge_idx, and the merge candidate derivation unit 30361 derives bcwIdx of each merge candidate. Specifically, the merge candidate derivation unit 30361 uses the weight coefficient of the adjacent block used for derivation of the merge candidate as the weight coefficient of the merge candidate used for the target block. In other words, in the merge mode, the weight coefficient used in the past is inherited as a weight coefficient for the target block.

Intra Prediction Image Generation Unit 310

In a case that predMode indicates an intra prediction mode, the intra prediction image generation unit 310 performs an intra prediction by using an intra prediction parameter input from the intra prediction parameter derivation unit 304 and a reference picture read out from the reference picture memory 306.

The inverse quantization and inverse transform processing unit 311 performs inverse quantization on a quantization transform coefficient input from the parameter decoder 302 to derive a transform coefficient.

The addition unit 312 adds the prediction image of the block input from the prediction image generation unit 308 and the prediction error input from the inverse quantization and inverse transform processing unit 311 to each other for each pixel, and generates a decoded image of the block. The addition unit 312 stores the decoded image of the block in the reference picture memory 306, and also outputs it to the loop filter 305.

The inverse quantization and inverse transform processing unit 311 performs inverse quantization on a quantization transform coefficient input from the parameter decoder 302 to derive a transform coefficient.

The addition unit 312 adds the prediction image of the block input from the prediction image generation unit 308 and the prediction error input from the inverse quantization and inverse transform processing unit 311 to each other for each pixel, and generates a decoded image of the block. The addition unit 312 stores the decoded image of the block in the reference picture memory 306, and also outputs it to the loop filter 305.

Configuration of Video Coding Apparatus

Figure 12:
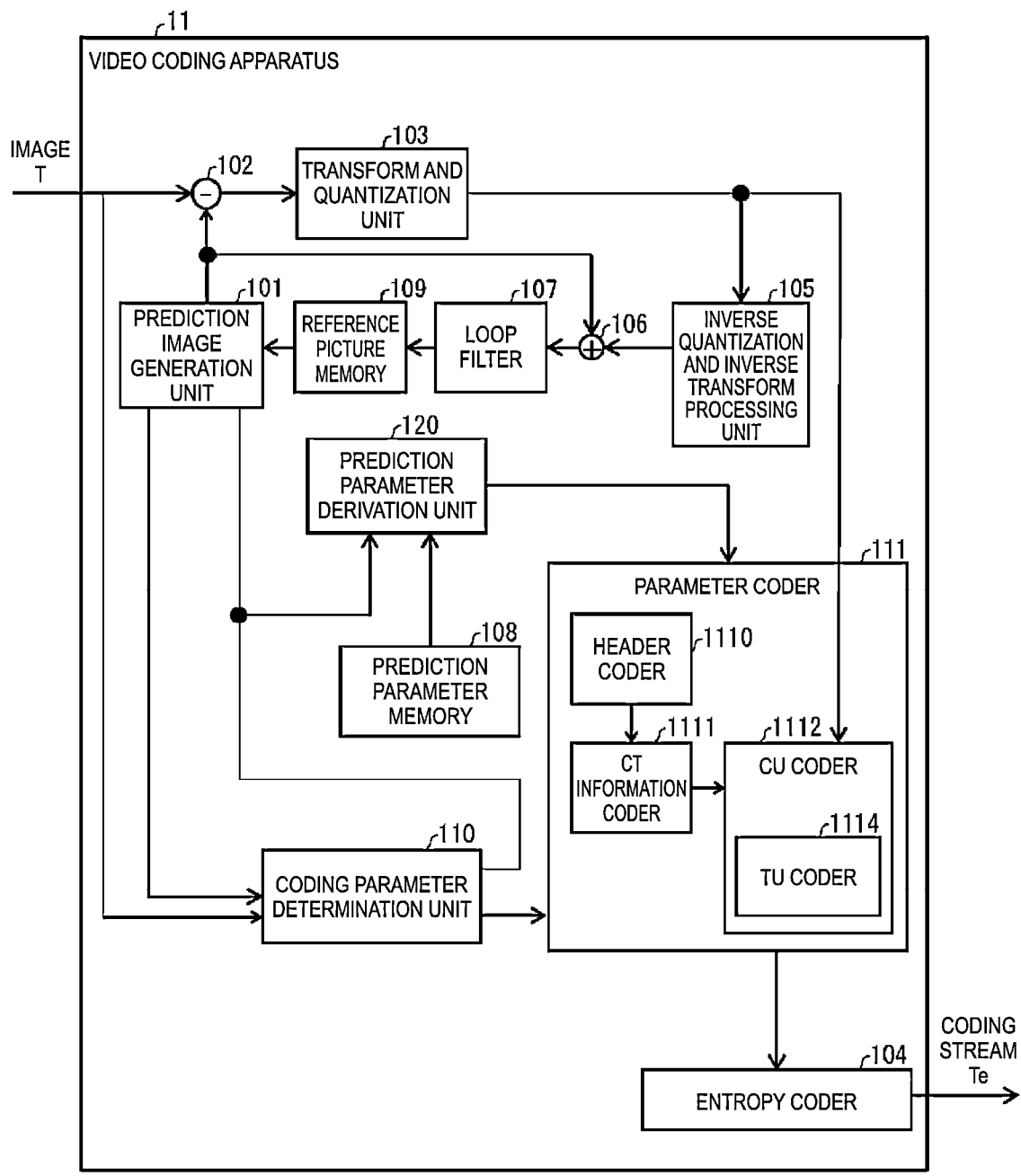
FIG. 12 is a block diagram illustrating a configuration of a video coding apparatus.

Next, a configuration of the video coding apparatus 11 according to the present embodiment will be described. FIG. 12 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit 310 already described, and description of these units is omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the parameter coder 111 and the inverse quantization and inverse transform processing unit 105.

The inverse quantization and inverse transform processing unit 105 is the same as the inverse quantization and inverse transform processing unit 311 (FIG. 6) in the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantization transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supplies, to the parameter coder 111, syntax elements such as the inter prediction parameters (predMode, merge_flag, merge_idx, inter_pred_idc, refIdxLX, mvp_LX_idx, mvdLX), the intra prediction parameters (intra_luma_mpm_flag, intra_luma_mpm_idx, intra_luma_mpm_reminder, intra_chroma_pred_mode), and the quantization transform coefficient.

The parameter coder 111 inputs the quantization transform coefficient and the coding parameters (split information and prediction parameters) to the entropy coder 104. The entropy coder 104 entropy-codes the quantization transform coefficient and the coding parameters to generate a coding stream Te and outputs the coding stream Te.

The prediction parameter derivation unit 120 is a component including the inter prediction parameter coder 112 and the intra prediction parameter coder 113, and derives an intra prediction parameter and an intra prediction parameter from the parameters input from the coding parameter determination unit 110. The intra prediction parameter and intra prediction parameter derived are output to the parameter coder 111.

Configuration of Inter Prediction Parameter Coder

Figure 13:
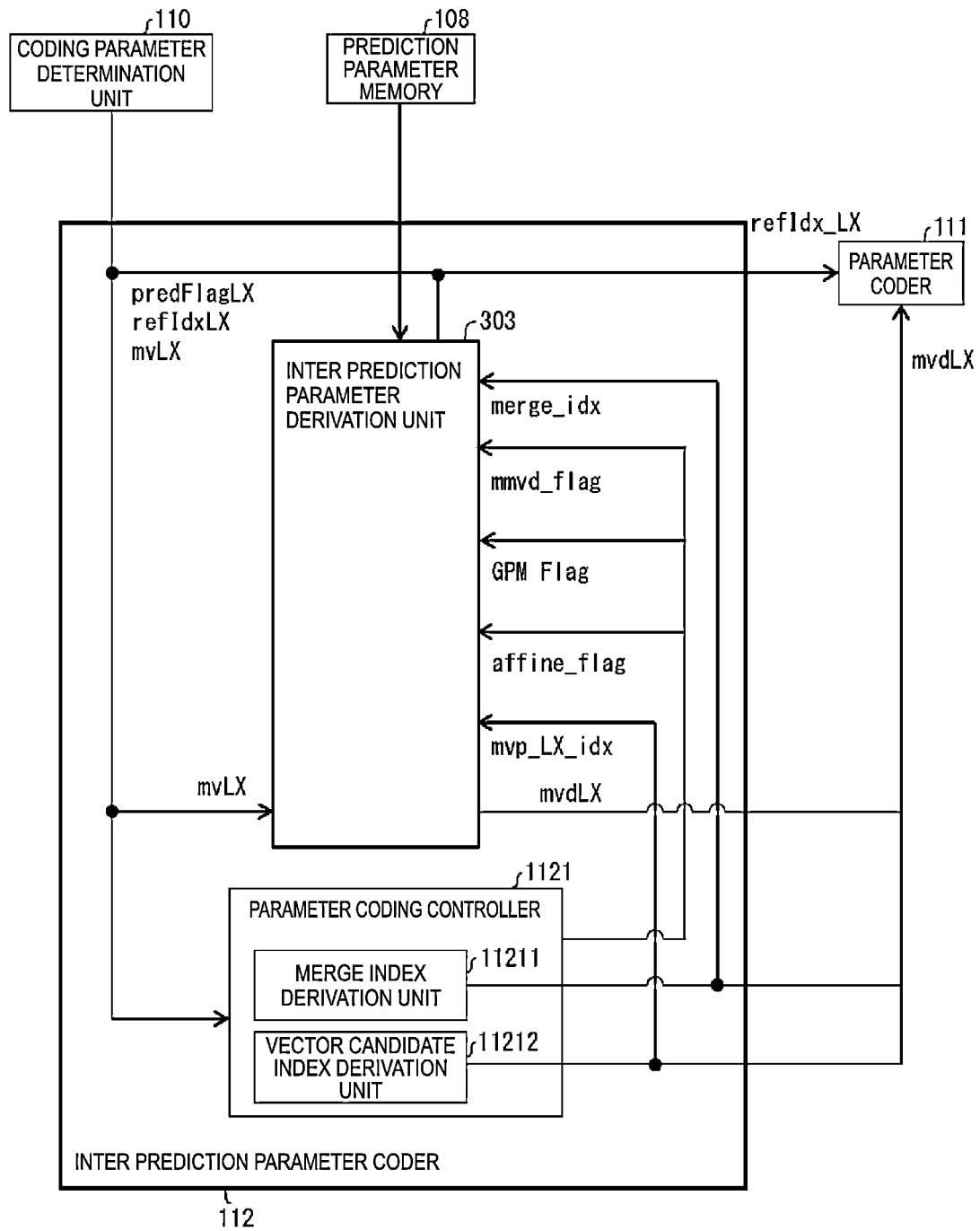
FIG. 13 is a schematic diagram illustrating a configuration of an inter prediction parameter coder.

The inter prediction parameter coder 112 includes a parameter coding control unit 1121 and an inter prediction parameter derivation unit 303 as described in FIG. 13. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder 113

Figure 14:
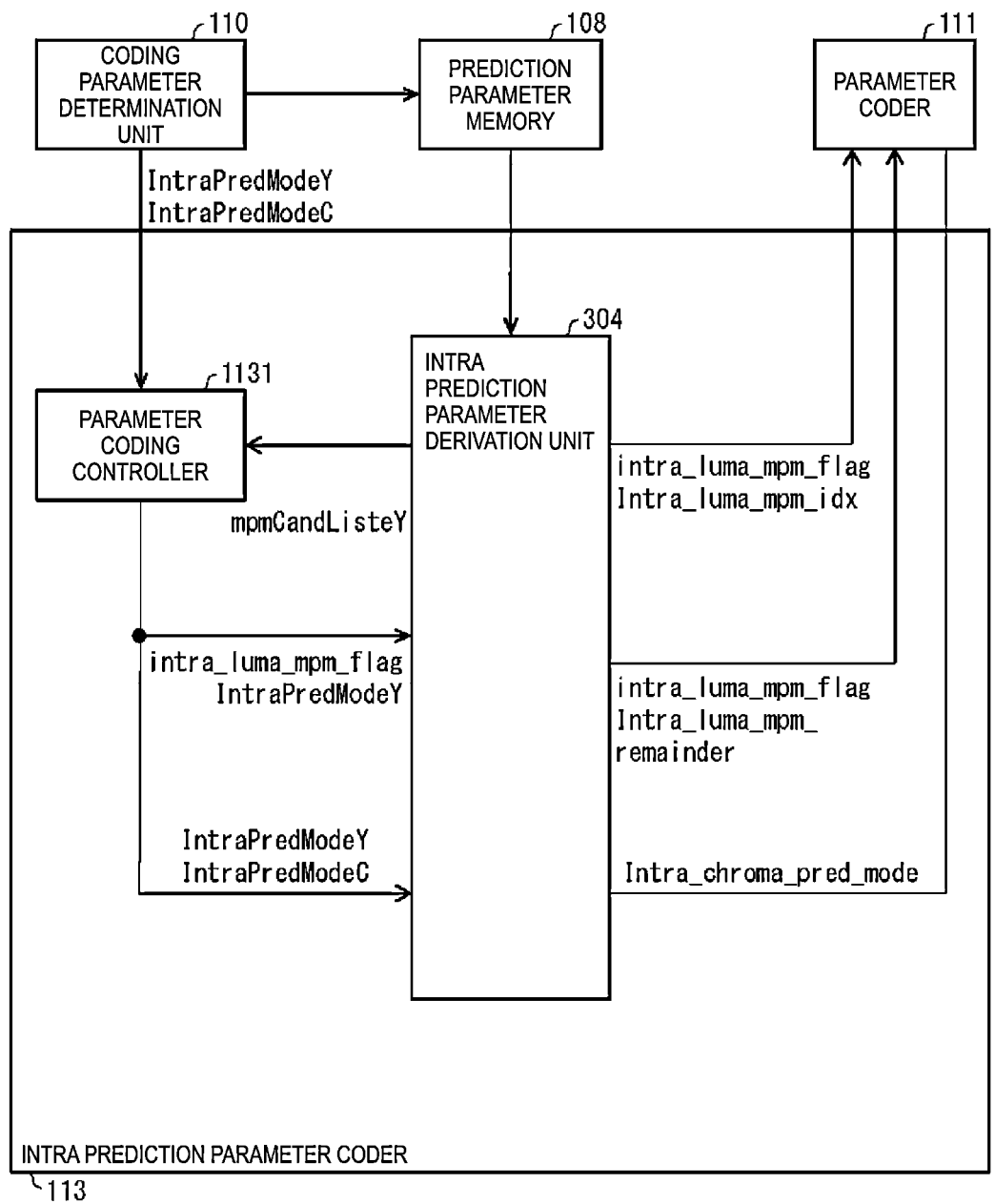
FIG. 14 is a schematic diagram illustrating a configuration of an intra prediction parameter coder.

As illustrated in FIG. 14, the intra prediction parameter coder 113 includes a parameter coding controller 1131 and the intra prediction parameter derivation unit 304. The intra prediction parameter derivation unit 304 has a configuration common to the video decoding apparatus.

The parameter coding controller 1131 derives IntraPredModeY and IntraPredModeC. Furthermore, with reference to mpmCandList[ ], intra_luma_mpm_flag is determined. These prediction parameters are output to the intra prediction parameter derivation unit 304 and the parameter coder 111.

However, unlike in the video decoding apparatus, the coding parameter determination unit 110 and the prediction parameter memory 108 provide input to the inter prediction parameter derivation unit 303 and the intra prediction parameter derivation unit 304, and output from the inter prediction parameter derivation unit 303 and the intra prediction parameter derivation unit 304 is provided to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient k by a square error. The code amount is an amount of information of the coding stream Te obtained by performing entropy coding on a quantization error and a coding parameter. The square error is the sum of prediction errors calculated in the subtraction unit 102. The coefficient k is a real number greater than a preconfigured zero. The coding parameter determination unit 110 selects a set of coding parameters of which cost value calculated is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder111, and the prediction parameter derivation unit 120. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

Syntax

FIG. 15(a) illustrates a part of syntax of a Sequence Parameter Set (SPS) of NPL 1. sps_weighted_pred_flag is a flag indicating whether or not weighted prediction may be applied to P slices that reference the SPS. sps_weighted_pred_flag being equal to 0 indicates that the weighted prediction is applied to the P slices that reference the SPS. sps_weighted_pred_flag being equal to 0 indicates that the weighted prediction is not applied to the P slices that reference the SPS.

sps_weighted_bipred_flag is a flag indicating whether or not weighted prediction may be applied to B slices that reference the SPS. sps_weighted_bipred_flag being equal to 0 indicates that the weighted prediction is applied to the B slices that reference the SPS. sps_weighted_bipred_flag being equal to 0 indicates that the weighted prediction is not applied to the B slices that reference the SPS.

long_term_ref_pics_flag is a flag indicating whether or not a long-term picture is used.

inter_layer_ref_pics_present_flag is a flag indicating whether or not inter-hierarchy prediction is used.

sps_idr_rpl_present_flag is a flag indicating whether or not the reference picture list is defined in the slice header of an Instantaneous Decoding Refresh picture (IDR picture).

In a case that rpl1_same_as_rpl0_flag is 1, it is indicated that information for the reference picture list 1 is not present, and num_ref_pic_lists_in_sps[0] and ref_pic_list_struct (0, rplsIdx) are the same.

FIG. 15(b) illustrates a part of the syntax of the Picture Parameter Set (PPS) in NPL 1.

In a case that i is 0, num_ref_idx_default_active_minus1[i]+1 indicates a value of a variable NumRefIdxActive[0] of the P or B slices of a case that num_ref_idx_active_override_flag is 0. A case that i is 1 indicates a value of a variable NumRefIdxActive[1] of the B slices of a case that num_ref_idx_active_override_flag is equal to 0. A value of num_ref_idx_default_active_minus1[i] needs to be within a range of values of 0 to 14.

pps_weighted_pred_flag is a flag indicating whether or not the weighted prediction is applied to the P slices that reference the PPS. pps_weighted_pred_flag being equal to 0 indicates that the weighted prediction is not applied to P slices that reference the PPS. pps_weighted_pred_flag being equal to 1 indicates that the weighted prediction is applied to the P slices that reference the PPS. In a case that sps_weighted_pred_flag is equal to 0, the weighted prediction unit 3094 sets the value of pps_weighted_pred_flag equal to 0. In a case that pps_weighted_pred_flag is not present, then the value is set equal to 0.

pps_weighted_bipred_flag is a flag indicating whether or not the weighted prediction is applied to the B slices that reference the PPS. pps_weighted_bipred_flag being equal to 0 indicates that the weighted prediction is not applied to B slices that reference the PPS. pps_weighted_bipred_flag being equal to 1 indicates that the weighted prediction is applied to the B slices that reference the PPS. In a case that sps_weighted_bipred_flag is equal to 0, the weighted prediction unit 3094 sets the value of pps_weighted_bipred_flag equal to 0. In a case that pps_weighted_bipred_flag is not present, then the value is set equal to 0.

rpl_info_in_ph_flag is a flag indicating whether or not reference picture list information is present in the picture header. rpl_info_in_ph_flag being equal to 1 indicates that the reference picture list information is present in the picture header. rpl_info_in_ph_flag being equal to 0 indicates that the reference picture list information is not present in the picture header, and the slice header may be present.

In a case that pps_weighted_pred_flag is equal to 1, pps_weighted_bipred_flag is equal to 1, or rpl_info_in_ph_flag is equal to 1, wp_info_in_ph_flag is present. wp_info_in_ph_flag being equal to 1 indicates that weighted prediction information pred_weight_table is present in the picture header, and is not present in the slice header. wp_info_in_ph_flag being equal to 0 indicates that the weighted prediction information pred_weight_table is not present in the picture header, and may be present in the slice header. In a case that wp_info_in_ph_flag is not present, a value of wp_info_in_ph_flag is equal to 0.

FIG. 16 illustrates a part of syntax of a picture header PH of NPL 1.

In a case that ph_inter_slice_allowed_flag is 0, it is indicated that slice_type of all of the slices of the picture is 2 (I Slice). In a case that ph_inter_slice_allowed_flag is 1, it is indicated that slice_type of at least one or more slices included in the picture is 0 (B Slice) or 1 (P Slice).

In a case that rpl_info_in_ph_flag is 1, ref_pic_lists( ) defining the reference picture list is called, and the reference picture list is selected.

ph_temporal_mvp_enabled_flag is a flag indicating whether to use the temporal motion vector prediction for the inter prediction of the slice associated with PH. In a case that ph_temporal_mvp_enabled_flag is 0, the temporal motion vector prediction cannot be used in the slice associated with PH. Otherwise (in a case that ph_temporal_mvp_enabled_flag is equal to 1), the temporal motion vector prediction can be used in the slice associated with PH. In a case of not being present, it is inferred that a value of ph_temporal_mvp_enabled_flag is equal to 0. In a case that the reference picture in DPB does not have the same spatial resolution as the current picture, the value of ph_temporal_mvp_enabled_flag is 0. In a case that ph_collocated_from_l0_flag is 1, it is indicated that the reference picture used for the temporal motion vector prediction is specified using the reference picture list 0. In a case that ph_collocated_from_l0_flag is 0, it is indicated that the reference picture used for the temporal motion vector prediction is specified using the reference picture list 1. ph_collocated_ref_idx indicates an index value of the reference picture used for the temporal motion vector prediction. In a case that ph_collocated_from_l0_flag is 1, ph_collocated_ref_idx refers to the reference picture list 0, and a value of ph_collocated_ref_idx needs to be within the range from 0 to num_ref_entries[0][RplsIdx[0]]−1. In a case that ph_collocated_from_l0_flag is 0, ph_collocated_ref_idx refers to the reference picture list 1, and the value of ph_collocated_ref_idx needs to be within the range from 0 to num_ref_entries[1][RplsIdx[1]]−1. In a case of not being present, it is inferred that the value of ph_collocated_ref_idx is equal to 0.

In a case that ph_inter_slice_allowed_flag is not 0, and pps_weighted_pred_flag is equal to 1, pps_weighted_bipred_flag is equal to 1, or wp_info_in_ph_flag is equal to 1, the weighted prediction information pred_weight_table is present.

(a) of FIG. 17 illustrates a part of syntax of the slice header of NPL 1. These syntaxes are decoded by the parameter decoder 302, for example.

In a case that num_ref_idx_active_override_flag is 1, it is indicated that a syntax element num_ref_idx_active_minus[0] is present for the P and B slices, and a syntax element num_ref_idx_active_minus1[1] is present for the B slice. In a case that num_ref_idx_active_override_flag is 0, it is indicated that the syntax element num_ref_idx_active_minus1[0] is not present for the P and B slices. In a case of not being present, it is inferred that a value of num_ref_idx_active_override_flag is equal to 1.

num_ref_idx_active_minus1[i] is used to derive the number of reference pictures actually used for a reference picture list i. The variable NumRefIdxActive[i] being the number of reference pictures actually used is derived by a method illustrated in FIG. 17(b). The value of num_ref_idx_active_minus1[i] needs to be a value from 0 to 14. In a case that the slice is the B slice, and num_ref_idx_active_override_flag is 1, and num_ref_idx_active_minus1[i] is not present, it is inferred that num_ref_idx_active_minus1[i] is equal to 0.

In a case that the value of ph_temporal_mvp_enabled_flag is 1, and rpl_info_in_ph_flag is not 1, information related to the temporal motion vector prediction is present in the slice header. In this case, in a case that slice_type of the slice is equal to B, slice_collocated_from_l0_flag is specified. rpl_info_in_ph_flag is a flag indicating that information related to the reference picture list is present in the picture header.

In a case that slice_collocated_from_l0_flag is 1, it is indicated that the reference picture used for the temporal motion vector prediction is derived from the reference picture list 0. In a case that slice_collocated_from_l0_flag is 0, it is indicated that the reference picture used for the temporal motion vector prediction is derived from the reference picture list 1. In a case that slice_type is equal to B or P, ph_temporal_mvp_enabled_flag is equal to 1, and slice_collocated_from_l0_flag is not present, the following is applied. In a case that rpl_info_in_ph_flag is not 1, it is inferred that slice_collocated_from_l0_flag is equal to ph_collocated_from_l0_flag. Otherwise (in a case that rpl_info_in_ph_flag is 0 and slice_type is equal to P), it is inferred that the value of slice_collocated_from_l0_flag is equal to 1.

slice_collocated_ref_idx indicates an index specifying the reference picture used for the temporal motion vector prediction. In a case that slice_type is P or slice_type is B, and slice_collocated_from_l0_flag is 1, slice_collocated_ref_idx refers to the reference picture list 0, and the value of slice_collocated_ref_idx needs to be 0 to NumRefIdxActive[0]−1. In a case that slice_type is B and slice_collocated_from_l0_flag is 0, slice_collocated_ref_idx refers to the reference picture list 1, and the value of slice_collocated_ref_idx needs to be 0 to NumRefIdxActive[1]−1. In a case that slice_collocated_ref_idx is not present, the following is applied. In a case that rpl_info_in_ph_flag is 1, it is inferred that the value of slice_collocated_ref_idx is equal to ph_collocated_ref_idx. Otherwise (in a case that rpl_info_in_ph_flag is equal to 0), it is inferred that the value of slice_collocated_ref_idx is equal to 0. The reference picture indicated by slice_collocated_ref_idx needs to be the same in all of the slices in the picture. The values of pic_width_in_luma_samples and pic_height_in_luma_samples of the reference picture indicated by slice_collocated_ref_idx need to be equal to the values of pic_width_in_luma_samples and pic_height_in_luma_samples of the current picture, and RprConstraintsActive[slice_collocated_from_l0_flag?0:1][slice_collocated_ref_idx] needs to be equal to 0.

In a case that wp_info_in_ph_flag is not 1, and pps_weighted_pred_flag is equal to 1 and slice_type is 1 (P Slice), or pps_weighted_bipred_flag is equal to 1 and slice_type is 0 (B Slice), pred_weight_table is called.

FIG. 17(b) illustrates a derivation method of the variable NumRefIdxActive[i] of NPL 1 by the prediction parameter derivation unit 320. Regarding the reference picture list i (=0, 1), in a case of the reference picture list 0 with the B slice or the P slice, in a case that num_ref_idx_active_override_flag is equal to 1, the variable NumRefIdxActive[i] is set equal to a value obtained by adding 1 to the value of num_ref_idx_active_minus1[i]. Otherwise (in a case of the reference picture list 0 with the B slice or the P slice, and in a case that num_ref_idx_active_override_flag is equal to 0), in a case that the value of num_ref_entries[i][RplsIdx[i]] is equal to or greater than a value obtained by adding 1 to num_ref_idx_default_active_minus1[i], the variable NumRefIdxActive[i] is set equal to the value obtained by adding 1 to num_ref_idx_default_active_minus1[i], otherwise the variable NumRefIdxActive[i] is set equal to the value of num_ref_entries[i][RplsIdx[i]]. num_ref_idx_default_active_minus1[i] is a value of a default variable NumRefIdxActive[i] defined in the PPS. In a case of the I slice, or in a case of the reference picture list 1 with the P slice, the variable NumRefIdxActive[i] is set equal to 0.

FIG. 18 illustrates syntax of the weighted prediction information pred_weight_table of NPL 1.

Here, in a case that wp_info_in_ph_flag is equal to 1, num_l0_weights indicates the number of weights signaled to entries of the reference picture list 0. A value of num_l0_weights is in the range from 0 to min(15, num_ref_entries[0][RplsIdx[0]]). In a case that wp_info_in_ph_flag is equal to 1, a variable NumWeightsL0 is set equal to num_l0_weights. Otherwise (wp_info_in_ph_flag is equal to 0), NumWeightsL0 is set equal to NumRefIdxActive[0]. Here, num_ref_entries[i][RplsIdx[i]] indicates the number of reference pictures of the reference picture list i. The variable RplsIdx[i] is an index value indicating multiple lists present of the reference picture list i.

In a case that both of pps_weighted_bipred_flag and wp_info_in_ph_flag are equal to 1, num_l1_weights specifies the number of weights signaled to entries of the reference picture list 1. A value of num_l1_weights is within the range from 0 to min(15, num_ref_entries[1][RplsIdx[1]]).

In a case that pps_weighted_bipred_flag is 0, the variable NumWeightsL1 is set equal to 0, otherwise, i.e., in a case that wp_info_in_ph_flag is 1, the variable NumWeightsL1 is set equal to the value of num_l1_weights, otherwise, the variable NumWeightsL1 is set equal to NumRefIdxActive[1].

luma_log 2_weight_denom is base 2 logarithm for the denominators of all luminance weight coefficients. The value of luma_log 2_weight_denom needs to be in a range from 0 to 7. delta_chroma_log 2_weight_denom is a difference in base 2 logarithm for the denominators of all chrominance weight coefficients. In a case that delta_chroma_log 2_weight_denom is absent, delta_chroma_log 2_weight_denom is inferred to be equal to 0. The variable ChromaLog2WeightDenom is derived to be equal to luma_log 2_weight_denom+delta_chroma_log 2_weight_denom, and the value needs to be in a range from 0 to 7.

luma_weight_l0_flag[i] being 1 indicates that a weight coefficient of the luminance component for the L0 prediction is present. luma_weight_l0_flag[i] being 0 indicates that a weight coefficient of the luminance component for the L0 prediction is absent. In a case that the luma_weight_l0_flag[i] is absent, the weighted prediction unit 3094 infers that luma_weight_l0_flag[i] is equal to 0. chroma_weight_l0_flag[i] being 1 indicates that a weight coefficient of the chrominance prediction value for the L0 prediction is present. chroma_weight_l0_flag[i] being 0 indicates that a weight coefficient of the chrominance prediction value for the L0 prediction is absent. In a case that chroma_weight_l0_flag[i] is absent, then the weighted prediction unit 3094 infers that chroma_weight_l0_flag[i] is equal to 0.

delta_luma_weight_l0[i] is a difference in weight coefficient applied to the luminance prediction value for the L0 prediction using RefPicList[0][i]. The variable LumaWeightL0[i] is derived to be equal to (1«luma_log 2_weight_denom)+delta_luma_weight_1 0[i]. In a case that luma_weight_l0_flag[i] is equal to 1, the value of delta_luma_weight_l0[i] needs to be in a range from −128 to 127. In a case that luma_weight_l0_flag[i] is equal to 0, then the weighted prediction unit 3094 infers that LumaWeightL0[i] is equal to the value of 2 to the luma_log 2_weight_denom-th power (2^luma_log 2_weight_denom).

luma_offset_l0[i] is an offset value applied to the luminance prediction value for the L0 prediction using RefPicList[0][i]. The value of luma_offset_l0[i] needs to be in a range from −128 to 127. In a case that luma_weight_l0_flag[i] is equal to 0, then the weighted prediction unit 3094 infers that luma_offset_l0[i] is equal to 0.

delta_chroma_weight_l0[i][j] is a difference in weight coefficient applied to the chrominance prediction value for the L0 prediction using RefPicList0[i] with j of 0 for Cb and j of 1 for Cr. The variable ChromaWeightL0[i][j] is derived to be equal to (1«ChromaLog2WeightDenom)+delta_chroma_weight_l0[i][j]. In a case that chroma_weight_l0_flag

[i] is equal to 1, the value of delta_chroma_weight_l0[i][j] needs to be in a range from −128 to 127. In a case that chroma_weight_l0_flag[i] is 0, then the weighted prediction unit 3094 infers that ChromaWeightL0[i][j] is equal to the value of 2 to the ChromaLog2WeightDenom-th power (2^ChromaLog2WeightDenom). delta_chroma_offset_l0[i][j] is a difference in an offset value applied to the chrominance prediction value for the L0 prediction using RefPicList0[i] with j of 0 for Cb and j of 1 for Cr. The variable ChromaOffsetL0[i][j] is derived as follows.

ChromaOffsetL0[$i$][$j$]=Clip3(−128,127,(128+delta_chroma_offset_$l0$[$i$][$j$]−((128*ChromaWeightL0[$i$][$j$])»ChromaLog2WeightDenom)))

The value of delta_chroma_offset_l0[i][j] needs to be in a range from −4*128 to 4*127. In a case that chroma_weight_l0_flag[i] is equal to 0, the weighted prediction unit 3094 infers that ChromaOffsetL0[i][j] is equal to 0.

Note that luma_weight_l1_flag [i], chroma_weight_l1_flag [i], delta_luma_weight_l1[i], luma_offset_l1[i], delta_chroma_weight_l1[i][j], and delta_chroma_offset_l1[i][j] are respectively interpreted as luma_weight_l0_flag[i], chroma_weight_l0_flag[i], delta_luma_weight_l0[i], luma_offset_l0[i], delta_chroma_weight_l0[i][j], and delta_chroma_offset_l0[i][j], and that l0, L0, list0, and List0 are respectively interpreted as l1, l1, list1, and List1.

FIG. 19(*a*) illustrates syntax of ref_pic_lists( ) defining the reference picture list of NPL 1. ref_pic_lists( ) may be present in the picture header or the slice header. In a case that rpl_sps_flag[i] is 1, it is indicated that the reference picture list i of ref_pic_lists( ) is derived based on one of ref_pic_list_struct (listIdx, rplsIdx) of the SPS. Here, listIdx is equal to i (=0, 1), rplsIdx=rpl_idx[i].

In a case that rpl_sps_flag[i] is 0, it is indicated that the reference picture list i is derived based on ref_pic_list_struct (listIdx, rplsIdx). Here, listIdx is equal to i directly included in ref_pic_lists( ). In a case that rpl_sps_flag[i] is not present, the following is applied. In a case that num_ref_pic_lists_in_sps[i] is 0, it is inferred that a value of rpl_sps_flag[i] is 0. In a case that num_ref_pic_lists_in_sps[i] is greater than 0, in a case that rpl1_idx_present_flag is 0, and i is equal to 1, it is inferred that the value of rpl_sps_flag[1] is equal to rpl_sps_flag[0].

In a case that rpl_sps_flag[i] is 1, rpl_idx[i] is decoded. rpl_idx[i] is used for derivation of RplsIdx[i] to be described later, and RplsIdx[i] indicates an index rplsIdx of ref_pic_list_struct (listIdx, rplsIdx). ref_pic_list_struct (listIdx, rplsIdx) is used for derivation of the reference picture i. Here, listIdx is equal to i. In a case of not being present, it is inferred that a value of rpl_idx[i] is equal to 0. The value of rpl_idx[i] is within the range from 0 to num_ref_pic_lists_in_sps[i]−1. In a case that rpl_sps_flag[i] is 1, and num_ref_pic_lists_in_sps[i] is 1, it is inferred that the value of rpl_idx[i] is equal to 0. In a case that rpl_sps_flag[i] is 1, and rpl1_idx_present_flag is 0, it is inferred that the value of rpl_idx[1] is equal to rpl_idx[0]. The variable RplsIdx[i] is derived as follows.

RplsIdx[$i$]=(*rpl_sps_*flag[$i$])?*rpl_idx*[$i$]:*num_*ref_*pic_*lists_in_*sps*[$i$]

FIG. 19(*b*) illustrates syntax defining a reference picture list structure ref_pic_list_struct (listIdx, rplsIdx) of NPL 1.

ref_pic_list_struct (listIdx, rplsIdx) may be present in the SPS, the picture header, or the slice header. Depending on whether the syntax is included in the SPS, included in the picture header, or included in the slice header, the following is applied. In a case of being present in the picture or slice header, ref_pic_list_struct (listIdx, rplsIdx) indicates a reference image list listIdx of the current picture (picture including the slice). In a case of being present in the SPS, ref_pic_list_struct (listIdx, rplsIdx) indicates candidates of a reference picture list listIdx. The current picture can be referred from the picture header or the slice header to a list of ref_pic_list_struct (listIdx, rplsIdx) included in the SPS with an index value.

Here, num_ref_entries[listIdx][rplsIdx] indicates the number of ref_pic_list_struct (listIdx, rplsIdx). A value of num_ref_entries[listIdx][rplsIdx] is a value of 0 to MaxDpbSize+13. MaxDpbSize is the number of decoded pictures determined by a profile level.

ltrp_in_header_flag[listIdx][rplsIdx] is a flag indicating whether or not the long-term reference picture is present in ref_pic_list_struct (listIdx, rplsIdx).

inter_layer_ref_pic_flag[listIdx][rplsIdx][i] is a flag indicating whether or not the i-th element of the reference picture list of ref_pic_list_struct (listIdx, rplsIdx) is the inter-hierarchy prediction.

st_ref_pic_flag[listIdx][rplsIdx][i] is a flag indicating whether or not the i-th element of the reference picture list of ref_pic_list_struct (listIdx, rplsIdx) is the short-term reference picture.

abs_delta_poc_st[listIdx][rplsIdx][i] is a syntax element for deriving a difference absolute value of POC of the short-term reference picture.

strp_entry_sign_flag[listIdx][rplsIdx][i] is a flag for deriving positive and negative codes.

rpls_poc_lsb_lt[listIdx][rplsIdx][i] is a syntax element for deriving POC of the i-th long-term reference picture of the reference picture list of ref_pic_list_struct (listIdx, rplsIdx).

ilrp_idx[listIdx][rplsIdx][i] is a syntax element for deriving layer information of the i-th inter-hierarchy prediction reference picture of the reference picture list of ref_pic_list_struct (listIdx, rplsIdx).

A problem of the method described in NPL 1 is that, as illustrated in FIG. 19(*b*), 0 can be specified as the value of num_ref_entries[listIdx][rplsIdx] of the reference picture list structure ref_pic_list_struct (listIdx, rplsIdx). 0 indicates that the number of reference pictures of the reference picture list listIdx of pic_list_struct indicated by rplsIdx is 0. num_ref_entries can be specified regardless of slice_type. In a case of the reference picture list 0 of the P slice or the B slice, the number of reference pictures present in the reference picture list presupposes at least one or more. In a case that 0 is specified, there are no pictures to refer to, and thus the reference picture is undetermined.

In view of this, in the present embodiment, as illustrated in FIG. 20, a signaled syntax element is num_ref_entries_minus1[listIdx][rplsIdx] instead of num_ref_entries[listIdx][rplsIdx], and num_ref_entries_minus1[listIdx][rplsIdx] has a value of 0 to MaxDpbSize+14. In this manner, by prohibiting the number of reference pictures from being 0 optionally, the reference picture can be prevented from being undetermined.

Another problem of the method described in NPL 1 is that, by explicitly describing num_l0_weights and num_l1_weights as syntax in pred_weight_table of FIG. 18, the number of weights of the reference picture list 0 and the reference picture list 1 are described. At the time point that pred_weight_table is called in the picture header, the number of reference pictures of the reference picture list i is already defined in ref_pic_list_struct (listIdx, rplsIdx), and this syntax element is redundant. At the time point that pred_weight_table is called in the slice header, the number of reference pictures of the reference picture list i is already defined in NumRefIdxActive[i], and this syntax element is redundant. Thus, in the present embodiment, as illustrated in FIG. 21(a), before pred_weight_table is called in the picture header, the variable NumWeightsL0 is set equal to the value of num_ref_entries_minus1[0][RplsIdx[0]]+1. In a case that pps_weighted_bipred_flag is 1, the variable NumWeightsL1 is set equal to the value of num_ref_entries_minus1[1][RplsIdx[1]]+1, otherwise the variable NumWeightsL1 is set equal to 0. This is because, in a case that pps_weighted_bipred_flag is 0, the weighted prediction of the bi-directional prediction is not present. As illustrated in FIG. 21(b), before pred_weight_table is called in the slice header, the variable NumWeightsL0 is set equal to the value of the variable NumRefIdxActive[0], and the variable NumWeightsL1 is set equal to the value of the variable NumRefIdxActive[1]. Incidentally, the value of the variable NumRefIdxActive[1] in a case of the P slice is 0. As illustrated in FIG. 22, in pred_weight_table, by not explicitly describing num_l0_weights and num_l1_weights as syntax, and setting the variable NumWeightsL0 to the number of weights of the reference picture list 0 and the variable NumWeightsL1 to the reference picture list 1, redundancy can be eliminated.

FIG. 23 is an example of another embodiment of the present embodiment. In the present example, in pred_wight_table, the variable NumWeightsL0 and the variable NumWeightsL1 are defined. In a case that wp_info_in_ph_flag is equal to 1, the variable NumWeightsL0 is set equal to the value of num_ref_entries[0][PicRplsIdx[0]], otherwise the variable NumWeightsL0 is set equal to the value of the variable NumRefIdxActive[0]. wp_info_in_ph_flag is a flag indicating that the weighted prediction information is present in the picture header.

In a case that wp_info_in_ph_flag is equal to 1, and pps_weighted_bipred_flag is equal to 1, the variable NumWeightsL1 is set equal to the value of num_ref_entries[1][PicRplsIdx[I]]. pps_weighted_bipred_flag is a flag indicating that bi-directional weighted prediction is performed. In a case that wp_info_in_ph_flag is equal to 1, and pps_weighted_bipred_flag is 0, the variable NumWeightsL1 is set equal to 0. In a case that wp_info_in_ph_flag is equal to 0, NumWeightsL1 is set equal to the value of the variable NumRefIdxActive[1]. In this manner, by not explicitly describing num_l0_weights and num_l1_weights with syntax, and setting the variable NumWeightsL0 to the number of weights of the reference picture list 0 and the variable NumWeightsL1 to the number of weights of the reference picture list 1, redundancy can be eliminated.

Another problem of the method described in NPL 1 is that the number of active reference pictures is defined in the slice header but is not defined in the picture header.

In view of this, in another present embodiment, as illustrated in FIG. 24(a), the number of active reference pictures can also be defined in the picture header. The following syntax is decoded by the parameter decoder 302, for example. In a case that ph_inter_slice_allowed_flag is equal to 1, and rpl_info_in_ph_flag is equal to 1, the number of active reference pictures is defined. In a case that ph_inter_slice_allowed_flag is 1, it is indicated that the P slice or the B slice may be present in the picture. In a case that rpl_info_in_ph_flag is equal to 1, it is indicated that the reference picture list information is present in the picture header.

ph_num_ref_idx_active_override_flag is a flag indicating whether or not ph_num_ref_idx_active_minus1[0] and ph_num_ref_idx_active_minus1[1] are present.

ph_num_ref_idx_active_minus1[i] is a syntax element used for deriving the variable NumRefIdxActive[i] for the reference picture list i, and is a value of 0 to 14.

ph_collocated_ref_idx indicates an index of the reference picture used for the temporal motion vector prediction. In a case that ph_collocated_from_l0_flag is 1, ph_collocated_ref_idx refers to the reference picture list 0, and the value of ph_collocated_ref_idx is a value of 0 to NumRefIdxActive[0]−1. In a case that ph_collocated_from_l0_flag is 0, ph_collocated_ref_idx refers to entries of the reference picture list 1, and the value of ph_collocated_ref_idx is a value of 0 to NumRefIdxActive[1]−1. In a case of not being present, it is inferred that the value of ph_collocated_ref_idx is equal to 0.

FIG. 24(b) illustrates a derivation method of the variable NumRefIdxActive[i] by the prediction parameter derivation unit 320. Regarding the reference picture list i (=0, 1), in a case that ph_num_ref_idx_active_override_flag is 1, in a case that num_ref_entries_minus1[i][RplsIdx[i]] is greater than 0, the variable NumRefIdxActive[i] is set equal to a value obtained by adding 1 to the value of ph_num_ref_idx_active_minus1[i]. Otherwise, the variable NumRefIdxActive[i] is set equal to 1. In contrast, in a case that ph_num_ref_idx_active_override_flag is not 1, in a case that the value of num_ref_entries_minus1[i][RplsIdx[i]] is equal to or greater than a value obtained by adding 1 to num_ref_idx_default_active_minus1[i], the variable NumRefIdxActive[i] is set equal to the value obtained by adding 1 to num_ref_idx_default_active_minus1[i]. Otherwise, the variable NumRefIdxActive[i] is set equal to a value obtained by adding 1 to num_ref_entries_minus1[i][RplsIdx[i]]. num_ref_idx_default_active_minus1[i] is a value of a default variable NumRefIdxActive[i] defined in the PPS.

FIG. 25(a) is syntax of the slice header. The following syntax is decoded by the parameter decoder 302, for example. In the slice header, in a case that rpl_info_in_ph_flag indicating that the reference picture list information is present in the picture header is not 1, and in a case of the P slice or the B slice, the number of active reference pictures is defined.

FIG. 25(b) illustrates a derivation method of the variable NumRefIdxActive[i] by the prediction parameter derivation unit 320. Regarding the reference picture list i (=0, 1), in a case that rpl_info_in_ph_flag is not 1, and in a case that i is 0 with the B slice or the P slice, the variable NumRefIdxActive[i] is written over. In a case that num_ref_idx_active_override_flag is 1, in a case that num_ref_entries_minus1[i][RplsIdx[i]] is greater than 0, the variable NumRefIdxActive[i] is set equal to a value obtained by adding 1 to the value of num_ref_idx_active_minus1[i], otherwise the variable NumRefIdxActive[i] is set equal to 1. In a case that num_ref_idx_active_override_flag is not 1, in a case that the value of num_ref_entries_minus1[i][RplsIdx[i]] is equal to or greater than a value obtained by adding 1 to num_ref_idx_default_active_minus1[i], the variable NumRefIdxActive[i] is set equal to the value obtained by adding 1 to num_ref_idx_default_active_minus1[i], otherwise the variable NumRefIdxActive[i] is set equal to the value obtained by adding 1 to num_ref_entries_minus1[i][RplsIdx[i]]. In a case of the I slice, or that i is 1 with the P slice, the variable NumRefIdxActive[i] is set equal to 0 regardless of the value of rpl_info_in_ph_flag. rpl_info_in_ph_flag is a flag indicating that the reference picture list information is present in the picture header. num_ref_idx_default_active_minus1[i] is a value of a default variable NumRefIdxActive[i] defined in the PPS.

As illustrated in FIG. 26, in pred_weight_table, by not explicitly describing num_l0_weights and num_l1_weights as syntax, and setting the variable NumRefIdxActive[0] to the number of weights of the reference picture list 0 and the variable NumRefIdxActive[1] to the number of weights of the reference picture list 1, redundancy can be eliminated.

A problem of the method described in NPL 1 is that, as described above, 0 can be specified as the value of num_ref_entries[listIdx][rplsIdx] of the reference picture list structure ref_pic_list_struct (listIdx, rplsIdx). On the other hand, the number of reference pictures present in the reference picture list 0 of the P slice and the reference picture list of the B slice presupposes at least one or more. Thus, in a case that 0 is specified, there are no pictures to refer to, and there is a problem in that the reference picture is undetermined.

In view of this, first, depending on nal_unit_type indicating a type of a Network Abstraction Layer (NAL) unit and slice_type, the following restrictions are imposed on the value of num_ref_entries indicating the number of reference pictures of the reference picture list.

In a case that nal_unit_type is IDR_W_RADL or IDR_N_LP (that is, in a case of an IDR picture), num_ref_entries[i][RplsIdx[i]] needs to be 0 in both cases that i thereof is 0 and 1. i is an index listIdx indicating the reference picture list. Note that nal_unit_type of the IDR picture includes IDR_W_RADL and IDR_N_LP. IDR_W_RADL indicates that there is a possibility of having a Random Access Decodable Leading (RADL) picture output before the IDR picture, and IDR_N_LP indicates that there is no such possibility.

In a case that slice_type is P or B, num_ref_entries[0][RplsIdx[0]] needs to be a value greater than 0.

In a case that slice_type is B, num_ref_entries[1][RplsIdx[1]] needs to be a value greater than 0.

Based on this, in the present embodiment, syntax of the picture header of FIG. 27(a) is taken as an example. The following syntax is decoded by the parameter decoder 302, for example.

In a case that rpl_info_in_ph_flag is 1, as illustrated in the figure, in the picture header, ref_pic_lists( ) is called, and the reference picture list is selected.

Note that, in a case of the IDR picture, the reference picture list having a value of 0 needs to be selected in both cases that i of num_ref_entries[i][RplsIdx[i]] is 0 and 1.

In a case that the P slice or the B slice is present in the picture, with num_ref_entries[0][RplsIdx[0]], the reference picture list having a value greater than 0 needs to be selected.

In a case that the B slice is present in the picture, with num_ref_entries[1][RplsIdx[1]], the reference picture list having a value greater than 0 needs to be selected.

Based on this, the variable NumRefIdxActive[i] is derived using the number of active reference pictures. ph_num_ref_idx_active_override_flag is a flag indicating whether or not ph_num_ref_idx_active_minus1[0] and ph_num_ref_idx_active_minus1[1] are present. In a case that ph_num_ref_idx_active_override_flag is 1, ph_num_ref_idx_active_minus1[0] and ph_num_ref_idx_active_minus1[1] are present, and in a case that ph_num_ref_idx_active_override_flag is 0, ph_num_ref_idx_active_minus1[0] and ph_num_ref_idx_active_minus1[1] are not present. In a case that ph_num_ref_idx_active_override_flag is not present, the value is estimated to be 0.

ph_num_ref_idx_active_minus1[i], i=0, 1 is a syntax element used for deriving the variable NumRefIdxActive[i] for the reference picture list i, and is a value of 0 to 14.

ph_num_ref_idx_active_minus1[i]+1 needs to be a value of num_ref_entries[i]RplsIdx[i]] or less.

In a case that num_ref_entries[i][RplsIdx[i]] is greater than 1, a value is explicitly signaled. In a case that ph_num_ref_idx_active_minus1[i] is not present, the value is estimated to be 0.

FIG. 27(b) illustrates a derivation method of the variable NumRefIdxActive[i] by the prediction parameter derivation unit 320. Regarding the reference picture list i (=0, 1), in a case that ph_num_ref_idx_active_override_flag is 1, the variable NumRefIdxActive[i] is set equal to a value obtained by adding 1 to the value of ph_num_ref_idx_active_minus1[i]. In contrast, in a case that ph_num_ref_idx_active_override_flag is not 1, in a case that the value of num_ref_entries[i][RplsIdx[i]] is equal to or greater than a value obtained by adding 1 to num_ref_idx_default_active_minus1[i], the variable NumRefIdxActive[i] is set equal to the value obtained by adding 1 to num_ref_idx_default_active_minus1[i]. Otherwise, the variable NumRefIdxActive[i] is set equal to num_ref_entries[i][RplsIdx[i]]. num_ref_idx_default_active_minus1[i] is a value of a default variable NumRefIdxActive[i] defined in the PPS.

FIG. 28(a) is syntax of the slice header. The following syntax is decoded by the parameter decoder 302, for example.

In the slice header, in a case that rpl_info_in_ph_flag is not 1, and in a case that nal_unit_type is neither IDR_W_RADL nor IDR_N_LP or sps_idr_rpl_present_flag is 1, ref_pic_lists( ) is called, and the reference picture list is selected.

Note that, in a case of the IDR picture, the reference picture list having a value of 0 needs to be selected in both cases that i of num_ref_entries[i][RplsIdx[i]] is 0 and 1.

In a case of the P slice or the B slice, with num_ref_entries[0][RplsIdx[0]], the reference picture list having a value greater than 0 needs to be selected.

In a case of the B slice, with num_ref_entries[1][RplsIdx[1]], the reference picture list having a value greater than 0 needs to be selected.

Based on this, the variable NumRefIdxActive[i] is derived using the number of active reference pictures. In a case that slice_type is not I and num_ref_entries[0][RplsIdx[0]] is greater than 1, or slice_type is B and num_ref_entries[1][RplsIdx[1]] is greater than 1, num_ref_idx_active_override_flag is present. In a case that num_ref_idx_active_override_flag is 1, num_ref_idx_active_minus1[0] and num_ref_idx_active_minus1[1] are present. In a case that num_ref_idx_active_override_flag is 0, num_ref_idx_active_minus1[0] and num_ref_idx_active_minus1[1] are not present. In a case that num_ref_idx_active_override_flag is not present, the value is estimated to be 0.

num_ref_idx_active_minus1[i] is a syntax element used for deriving the variable NumRefIdxActive[i] for the reference picture list i, and is a value of 0 to 14.

num_ref_idx_active_minus1[i]+1 needs to be a value of num_ref_entries[i][RplsIdx[i]] or less.

In a case that slice_type is B, syntax elements of num_ref_idx_active_minus1[i] with i being 0 and 1 are present, and in a case that slice_type is other than B (in a case that slice_type is P), only a syntax element of num_ref_idx_active_minus1[0] is present.

In a case that num_ref_entries[i][RplsIdx[i]] is greater than 1, the value is explicitly indicated. In a case that num_ref_idx_active_minus1[i] is not present, the value is estimated to be 0.

FIG. 28(b) illustrates a derivation method of the variable NumRefIdxActive[i] by the prediction parameter derivation unit 320.

In a case of rpl_info_in_ph_flag being not 1 and of the B slice or the P slice of i=0, the following processing is performed. In a case that num_ref_idx_active_override_flag is 1, the variable NumRefIdxActive[i] is set equal to a value obtained by adding 1 to the value of num_ref_idx_active_minus1[i]. In a case that num_ref_idx_active_override_flag is not 1, in a case that the value of num_ref_entries[i][RplsIdx[i]] is equal to or greater than a value obtained by adding 1 to num_ref_idx_default_active_minus1[i], the variable NumRefIdxActive[i] is set equal to the value obtained by adding 1 to num_ref_idx_default_active_minus1[i]. Otherwise, the variable NumRefIdxActive[i] is set equal to num_ref_entries[i][RplsIdx[i]].

Otherwise, i.e., in a case of the I slice or the P slice of i=1, the variable NumRefIdxActive[i] is set equal to 0 regardless of the value of rpl_info_in_ph_flag. rpl_info_in_ph_flag is a flag indicating that the reference picture list information is present in the picture header. num_ref_idx_default_active_minus1[i] is a value of a default variable NumRefIdxActive[i] defined in the PPS.

APPLICATION EXAMPLES

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

First, referring to FIG. 2, it will be described that the above-mentioned video coding apparatus 11 and the video decoding apparatus 31 can be utilized for transmission and reception of videos.

Figure 2:
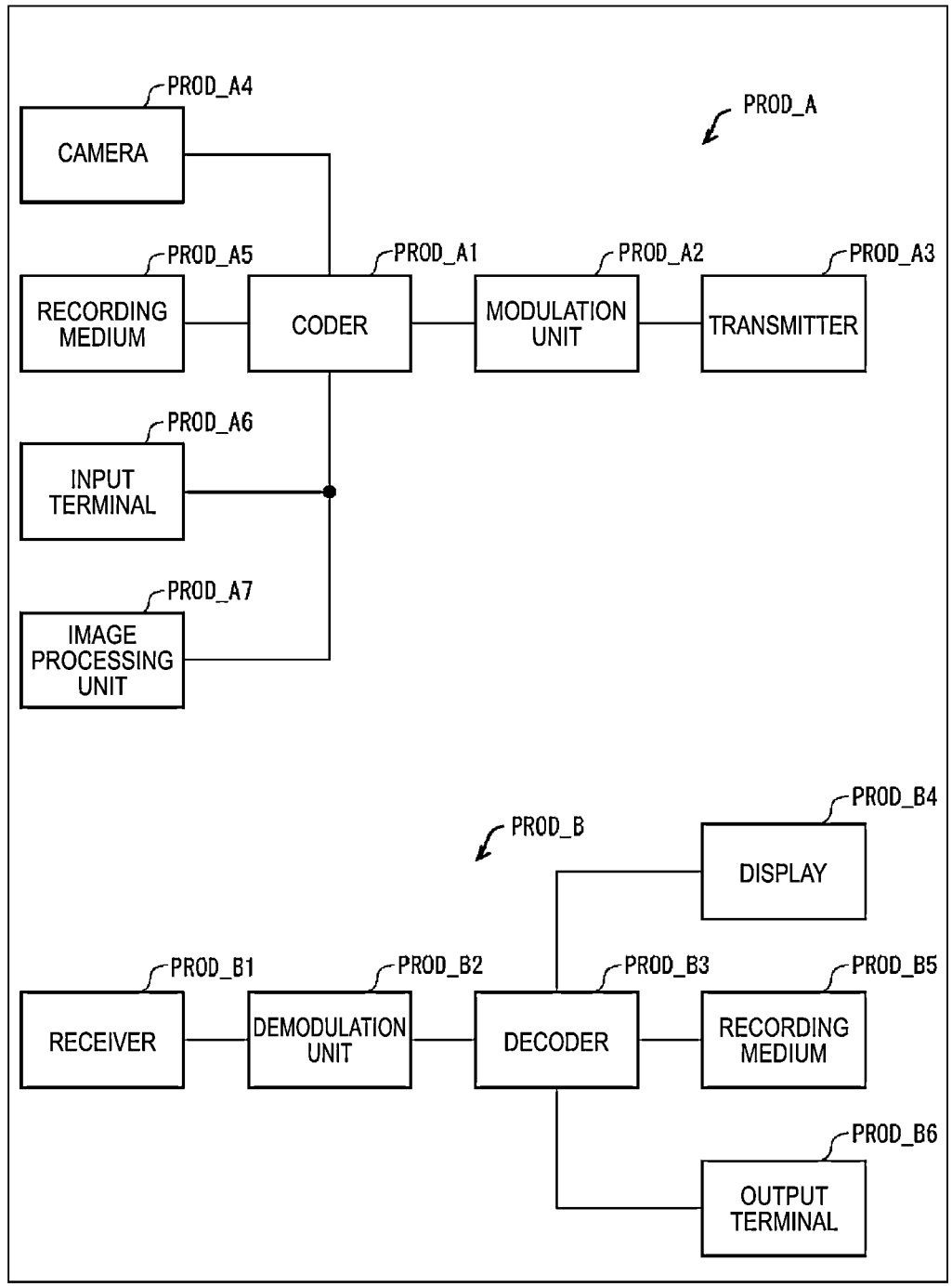
FIG. 2 is a diagram illustrating configurations of a transmitting apparatus equipped with a video coding apparatus and a receiving apparatus equipped with a video decoding apparatus according to the present embodiment. PROD_A illustrates the transmitting apparatus equipped with the video coding apparatus, and PROD_B illustrates the receiving apparatus equipped with the video decoding apparatus.

PROD_A in FIG. 2 is a block diagram illustrating a configuration of a transmitting apparatus PROD_A equipped with the video coding apparatus 11. As illustrated in FIG. 2(a), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

PROD_B in FIG. 2 is a block diagram illustrating a configuration of a receiving apparatus PROD_B equipped with the video decoding apparatus 31. As illustrated in the diagram, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

Note that a client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
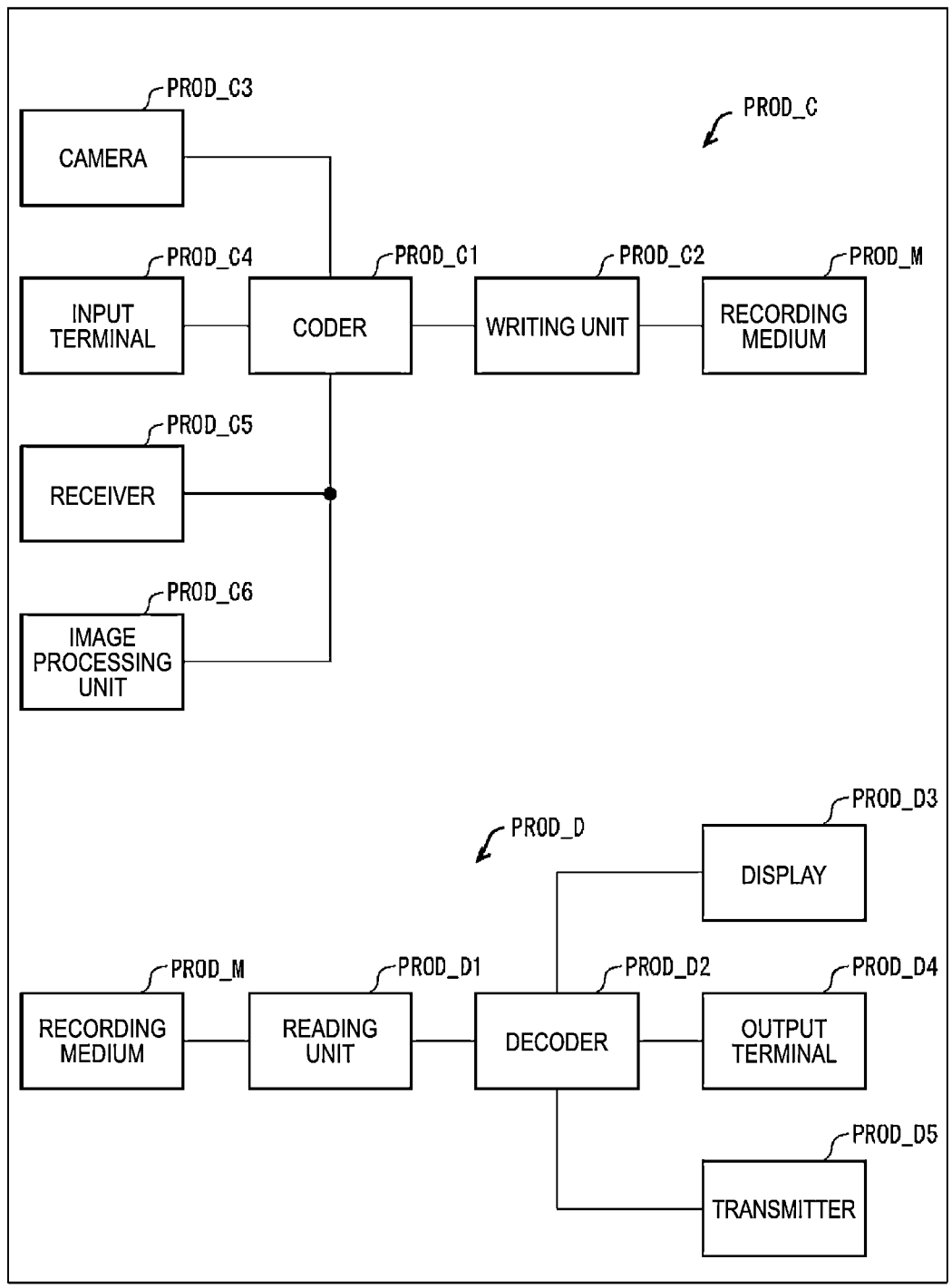
FIG. 3 is a diagram illustrating configurations of a recording apparatus equipped with the video coding apparatus and a reconstruction apparatus equipped with the video decoding apparatus according to the present embodiment. PROD_C illustrates the recording apparatus equipped with the video coding apparatus, and PROD_D illustrates the reconstruction apparatus equipped with the video decoding apparatus.

PROD_C in FIG. 3 is a block diagram illustrating a configuration of a recording apparatus PROD_C equipped with the above-mentioned video coding apparatus 11. As illustrated in FIG. 3, the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3 PROD-D is a block illustrating a configuration of a reconstruction apparatus PROD_D equipped with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc(DVD: trade name)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

The invention claimed is:

1. A video decoding apparatus for deriving a prediction image by using a reference picture in a reference picture list, the video decoding apparatus comprising:
    parameter decoding circuitry that decodes:
    (i) a reference picture list structure in a sequence parameter set,
    (ii) a first flag specifying whether first reference picture list information is present in a slice header whose nal_unit_type indicates an Instantaneous Decoding Refresh picture, wherein the first flag is included in the sequence parameter set,
    (iii) a first syntax element specifying a number of the reference picture list structure, wherein the first syntax element is included in the sequence parameter set,
    (iv) a second syntax element specifying a number of entries in the reference picture list structure, wherein the second syntax element is included in the reference picture list structure, and
    (v) a second flag specifying whether second reference picture list information is present in a picture header, wherein the second flag is included in a picture parameter set; and
    prediction parameter derivation circuitry that derives:
    (i) one of the first reference picture list information in the slice header by using (a) the nal_unit_type or the first flag and (b) the second flag, and the second reference picture list information in a picture header by using the second flag, and
    (ii) a reference picture list based on the reference picture list structure,
    wherein
    in a case that the nal_unit_type indicates the Instantaneous Decoding Refresh picture, a value of the second syntax element indicated by the first syntax element is set equal to 0.

2. The video decoding apparatus of claim 1, wherein the second syntax element is defined by a first variable i and a reference picture list index, wherein the reference picture list index is defined by the first variable i and a value of the first variable i is equal to 0 or 1.

3. The video decoding apparatus of claim 1, wherein the parameter decoding circuitry decodes a third flag, in a case that (i) a value of the second syntax element based on the first variable i equal to 0 is greater than 1 or (ii) a value of the second syntax element based on the first variable i equal to 1 is greater than 1,
    wherein a value of the third flag equal to 1 specifies that (i) a third syntax element defined by a first value is present for a P slice and a B slice, and (ii) a third syntax element defined by a second value is present for a B slice.

4. The video decoding apparatus of claim 3, wherein the second variable is a variable relating to a number of reference pictures.

5. A video encoding apparatus for deriving a prediction image by using a reference picture in a reference picture list, the video encoding apparatus comprising:
    parameter encoding circuitry that encodes:
    (i) a reference picture list structure in a sequence parameter set,
    (ii) a first flag specifying whether first reference picture list information is present in a slice header whose nal_unit_type indicates an Instantaneous Decoding Refresh picture, wherein the first flag is included in the sequence parameter set,
    (iii) a first syntax element specifying a number of the reference picture list structure, wherein the first syntax element is included in the sequence parameter set,
    (iv) a second syntax element specifying a number of entries in the reference picture list structure, wherein the second syntax element is included in the reference picture list structure, and
    (v) a second flag specifying whether second reference picture list information is present in a picture header, wherein the second flag is included in a picture parameter set; and prediction parameter derivation circuitry that derives:
(i) one of the first reference picture list information in the slice header by using (a) the nal_unit_type or the first flag and (b) the second flag, and the second reference picture list information in a picture header by using the second flag, and
(ii) a reference picture list based on the reference picture list structure,
wherein
in a case that the nal_unit_type indicates the Instantaneous Decoding Refresh picture, a value of the second syntax element indicated by the first syntax element is set equal to 0.

6. A video decoding method for deriving a prediction image by using a reference picture in a reference picture list, the video decoding method including:
  decoding a reference picture list structure in a sequence parameter set;
  decoding a first flag specifying whether first reference picture list information is present in a slice header whose nal_unit_type indicates an Instantaneous Decoding Refresh picture, wherein the first flag is included in the sequence parameter set;
  decoding a first syntax element specifying a number of the reference picture list structure, wherein the first syntax element is included in the sequence parameter set;
  decoding a second syntax element specifying a number of entries in the reference picture list structure, wherein the second syntax element is included in the reference picture list structure;
  decoding a second flag specifying whether second reference picture list information is present in a picture header, wherein the second flag is included in a picture parameter set;
  deriving one of the first reference picture list information in the slice header by using (a) the nal_unit_type or the first flag and (b) the second flag, and the second reference picture list information in a picture header by using the second flag; and
  deriving a reference picture list based on the reference picture list structure,
wherein
in a case that the nal_unit_type indicates the Instantaneous Decoding Refresh picture, a value of the second syntax element indicated by the first syntax element is set equal to 0.

* * * * *